US012614237B2

(12) United States Patent
Nandam et al.

(10) Patent No.: US 12,614,237 B2
(45) Date of Patent: Apr. 28, 2026

(54) SYSTEMS AND METHODS FOR COLLECTION AGENT WORKLIST GENERATION

(71) Applicant: HIGHRADIUS CORPORATION, Houston, TX (US)

(72) Inventors: Sunil Nandam, Houston, TX (US); Harsh Vardhan Singhania, Telangana (IN); Rajesh Bhonagiri, Telangana (IN); Rahul Gudla, Telangana (IN); Sashi Narahari, Houston, TX (US); Glen George, Telangana (IN)

(73) Assignee: HIGHRADIUS CORPORATION, Houston, TX (US)

( * ) Notice: Subject to any disclaimer, the term of this patent is extended or adjusted under 35 U.S.C. 154(b) by 164 days.

(21) Appl. No.: 18/089,972

(22) Filed: Dec. 28, 2022

(65) Prior Publication Data

US 2024/0070787 A1 Feb. 29, 2024

Related U.S. Application Data

(60) Provisional application No. 63/400,280, filed on Aug. 23, 2022.

(51) Int. Cl.
*G06Q 40/12* (2023.01)
*G06Q 10/0631* (2023.01)
*G06Q 10/0639* (2023.01)

(52) U.S. Cl.
CPC ..... *G06Q 40/12* (2013.12); *G06Q 10/063114* (2013.01); *G06Q 10/06398* (2013.01)

(58) Field of Classification Search
CPC ................... G06Q 40/00; G06Q 40/12; G06Q 10/063114; G06Q 10/06398

USPC .......................................................... 705/35
See application file for complete search history.

(56) References Cited

U.S. PATENT DOCUMENTS

| | | | |
|---|---|---|---|
| 6,546,387 B1 * | 4/2003 | Triggs ................. | H04L 43/0817 707/999.005 |
| 6,970,844 B1 * | 11/2005 | Bierenbaum .......... | G06Q 10/00 707/999.1 |
| 7,519,553 B2 * | 4/2009 | Abe ...................... | G06Q 40/00 705/30 |
| 11,074,528 B2 * | 7/2021 | Gupta ................... | G06N 3/006 |

(Continued)

OTHER PUBLICATIONS

The emergence of service science: Toward systematic service innovations to accelerate co-creation of value J Spohrer, PP Maglio—Production and operations management, 2008—Wiley Online Library (Year: 2008).*

*Primary Examiner* — Hani M Kazimi
(74) *Attorney, Agent, or Firm* — Quarles & Brady LLP

(57) ABSTRACT

Disclosed embodiments provide tools and techniques for the automated generation of a series of sets of collection worklists for collection agents. Consecutive sets of collection worksheets may be created in a series over any selected time interval, for example weekly, daily, or monthly. Worklists for one time interval can be combined into worklists for other time intervals. The generation of a collection worklist for a selected time interval can include several processing and monitoring steps implemented with machine learning or artificial intelligence. The collection worklists may then be provided to collections agents, collections managers, or downstream software modules to inform and guide the collection activities undertaken by collections agents.

20 Claims, 11 Drawing Sheets

(56) References Cited

U.S. PATENT DOCUMENTS

| | | | |
|---|---|---|---|
| 2006/0026011 A1* | 2/2006 | Verego | G06Q 10/063 |
| | | | 705/7.11 |
| 2014/0222716 A1* | 8/2014 | Joplin | G06Q 10/063 |
| | | | 705/36 R |
| 2018/0268339 A1* | 9/2018 | Malchev | G06F 30/20 |
| 2018/0285971 A1* | 10/2018 | Rosenoer | G06Q 40/03 |
| 2019/0066013 A1* | 2/2019 | Gupta | G06N 7/01 |
| 2023/0118645 A1* | 4/2023 | Liebler | G06Q 50/18 |
| | | | 705/30 |
| 2023/0177602 A1* | 6/2023 | Yadav | G06F 18/23 |
| | | | 705/38 |
| 2024/0013110 A1* | 1/2024 | Neuweg | G06Q 10/0637 |

* cited by examiner

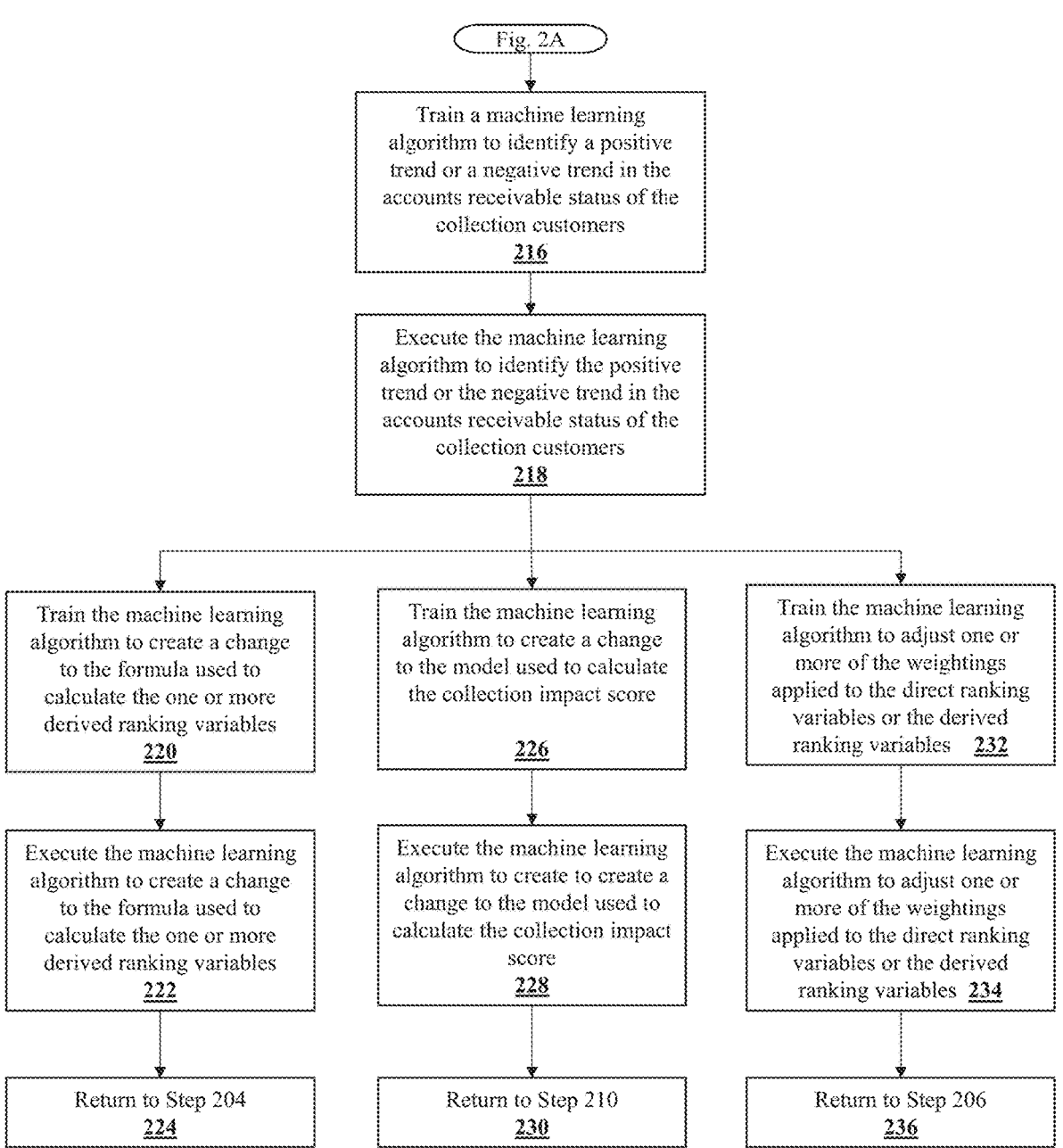

Fig. 2A

Train a machine learning algorithm to identify a positive trend or a negative trend in the accounts receivable status of the collection customers
216

Execute the machine learning algorithm to identify the positive trend or the negative trend in the accounts receivable status of the collection customers
218

Train the machine learning algorithm to create a change to the formula used to calculate the one or more derived ranking variables
220

Train the machine learning algorithm to create a change to the model used to calculate the collection impact score
226

Train the machine learning algorithm to adjust one or more of the weightings applied to the direct ranking variables or the derived ranking variables    232

Execute the machine learning algorithm to create a change to the formula used to calculate the one or more derived ranking variables
222

Execute the machine learning algorithm to create to create a change to the model used to calculate the collection impact score
228

Execute the machine learning algorithm to adjust one or more of the weightings applied to the direct ranking variables or the derived ranking variables  234

Return to Step 204
224

Return to Step 210
230

Return to Step 206
236

FIG. 2B

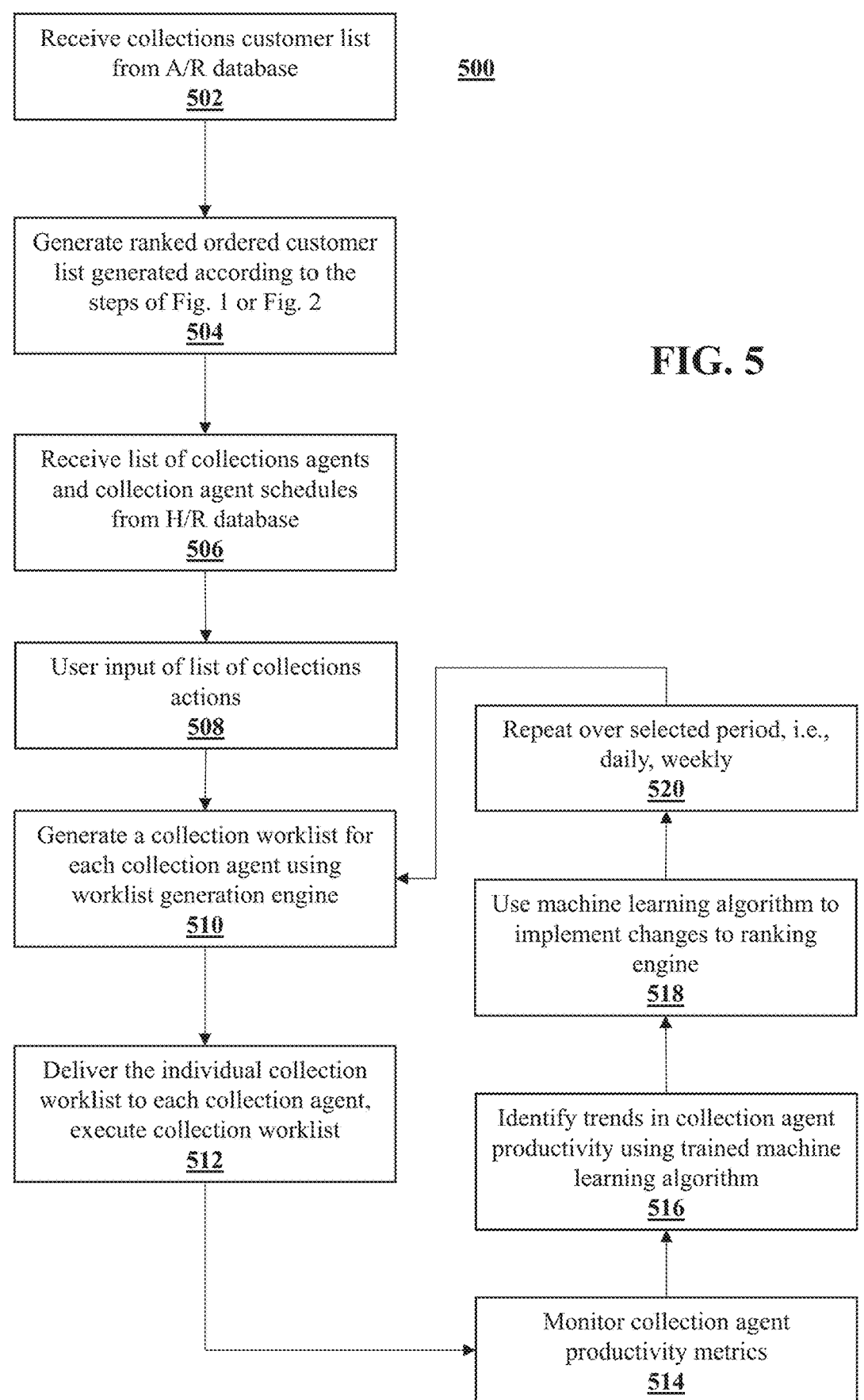

Receive collections customer list
from A/R database
502

Generate ranked ordered customer
list generated according to the
steps of Fig. 1 or Fig. 2
504

Receive list of collections agents
and collection agent schedules
from H/R database
506

User input of list of collections
actions
508

Generate a collection worklist for
each collection agent using
worklist generation engine
510

Deliver the individual collection
worklist to each collection agent,
execute collection worklist
512

Repeat over selected period, i.e.,
daily, weekly
520

Use machine learning algorithm to
implement changes to ranking
engine
518

Identify trends in collection agent
productivity using trained machine
learning algorithm
516

Monitor collection agent
productivity metrics
514

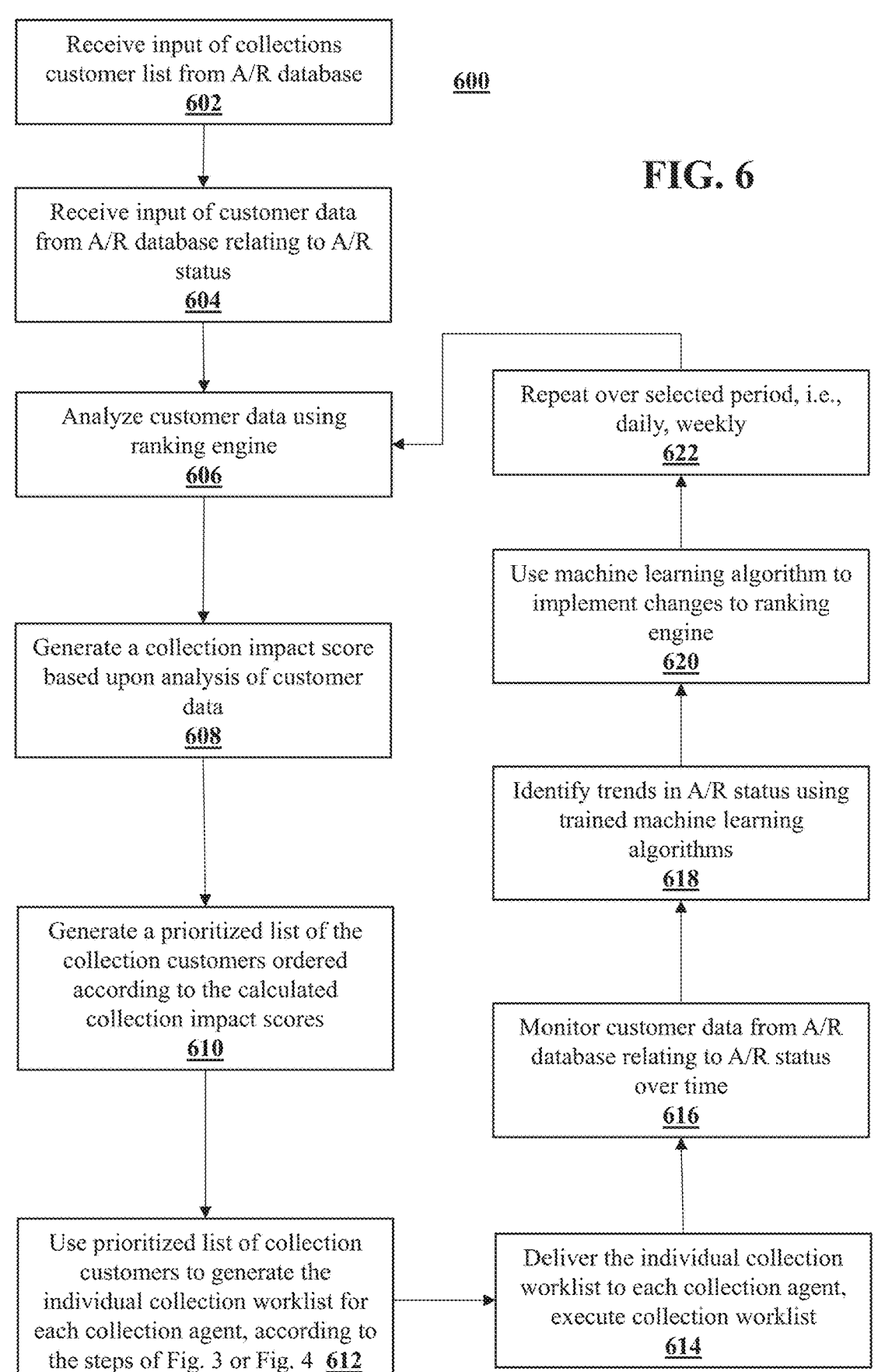

Receive input of collections customer list from A/R database
602

Receive input of customer data from A/R database relating to A/R status
604

Analyze customer data using ranking engine
606

Generate a collection impact score based upon analysis of customer data
608

Generate a prioritized list of the collection customers ordered according to the calculated collection impact scores
610

Use prioritized list of collection customers to generate the individual collection worklist for each collection agent, according to the steps of Fig. 3 or Fig. 4 612

Repeat over selected period, i.e., daily, weekly
622

Use machine learning algorithm to implement changes to ranking engine
620

Identify trends in A/R status using trained machine learning algorithms
618

Monitor customer data from A/R database relating to A/R status over time
616

Deliver the individual collection worklist to each collection agent, execute collection worklist
614

700

SYSTEMS AND METHODS FOR COLLECTION AGENT WORKLIST GENERATION

CROSS-REFERENCES TO RELATED APPLICATIONS

This application claims priority to U.S. Patent Application Ser. No. 63/400,280 (the "'280 application"), filed Aug. 23, 2022, by HighRadius Corporation, entitled, "Systems and Methods for Collection Impact Score Based Ranking and Personalized Worklist Generation," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to automated systems and methods for collection customer ranking and visualization for accounts receivable and collections management processes. The present disclosure also relates to automated systems and methods for the generation and visualization of personalized collections agent worklists.

BACKGROUND

Accounts receivable management, especially collections management is a very important process for many organizations. Organizations with significant accounts receivable management and collection activities continually try to improve the efficiency of their collections agents and collections departments to minimize the time required to collect payment from their collection customers after the completion of a sale or the delivery of a service.

Currently, each collections agent or collections department must design, develop, and implement strategies for contacting and communicating with each collections customer. The collections department goal is typically to collect the greatest quantity of outstanding accounts receivable as quickly as possible. The conventional implementation of collection strategies is a very human resource intensive and time-consuming process. In addition, collections agents and their department heads are unable to process the potentially huge dataset of outstanding collections customers and data reflective of the status of accounts receivable outstanding or to correlate this information with collection success or customer behavior to optimize collection efforts. These problems are significantly worse for collections departments working with many thousands of collection customers.

Currently, collection strategies developed by collection agents and accounts receivable departments are more likely opinion-based than being based upon objective analytical or data-driven approaches. Since known collections strategies are not data driven, many times the core reasons for high accounts receivable and bad collections results are not known or addressed effectively.

Another problem which is ubiquitous in accounts receivable management is effective worklist generation for collections agents. The number of customers that can be contacted on any given day is limited by the time available to each collections agent. Furthermore, each collections agent has various alternatives for contacting collections customers some of which are more or less effective for a given customer. Currently, worklist assignment for collections agents is also a highly opinion-based process rather than a process driven by an objective and data-based approach.

Hence, there is a need for robust and scalable solutions for ranking and visualizing collections customers in a precise and effective manner. Further, there is a need for effective solutions to optimize the generation of collections agent worklists and therefore optimize collection efforts.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 2A and FIG. 2B are a flow diagram illustrating an alternative method for the generation and visualization of a prioritized list of collection customers, prioritized based upon a need for collection activity as reflected in a collection impact score.

FIG. 5 is a flow diagram illustrating a method of generating individual collection worklists for collection agents, using a prioritized list of collection customers, prioritized based upon a need for collection activity as disclosed herein.

FIG. 6 is a flow diagram illustrating a method of generating individual collection worklists for collection agents, using a prioritized list of collection customers, prioritized based upon a need for collection activity as disclosed herein.

DETAILED DESCRIPTION OF CERTAIN EMBODIMENTS

Overview

Figure 1:
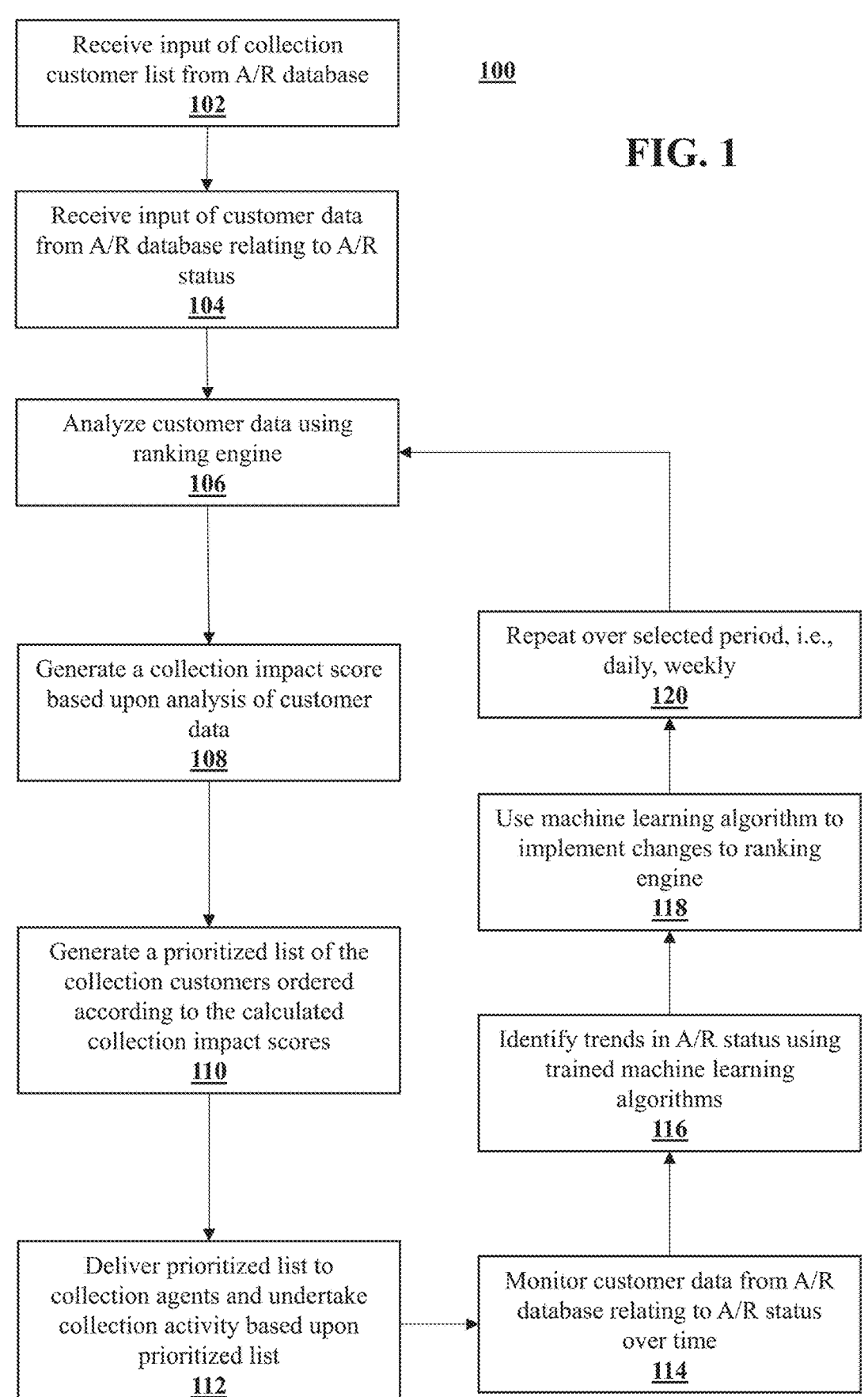
FIG. 1 is a flow diagram illustrating a method for the generation and visualization of a prioritized list of collection customers, prioritized based upon a need for collection activity.

Various embodiments provide tools and techniques for the automated prioritized ranking of collection customers for accounts receivable and collections management processes.

Other embodiments also provide tools and techniques for the generation and visualization of personalized collections agent worklists.

In some embodiments, one or more computing systems may repetitively generate a prioritized list of collection customers requiring collection activity. The prioritized lists can be generated at selected time intervals, for example daily, weekly, or monthly. The generation of the prioritized list for a selected time interval can include the following steps, each of which is described in greater detail below:

Inputting a plurality of data inputs to the computing system, including:

a list of collection customers;

one or more direct ranking variables related to the collection customers, wherein each direct ranking variable quantifies an accounts receivable status of one of the collection customers.

Processing the plurality of data inputs with the computing system to generate the prioritized list for one time interval by;

calculating one or more derived ranking variables from the one or more direct ranking variables, wherein each derived ranking variable is calculated according to a formula;

applying a weighting to selected direct ranking variables and selected derived ranking variables to create weighted direct ranking variables and weighted derived ranking variables;

inputting a plurality of the weighted direct ranking variables and the weighted derived ranking variables into a model to calculate a collections impact score for each of the collection customers; and generating the prioritized list of the collection customers, with the collection customers ordered on the prioritized list according to the calculated collection impact score for each collection customer.

The prioritized list may then be provided to collections agents, collections managers or downstream software modules as described herein. Ultimately, the prioritized list will inform and guide the collection activities undertaken by collections agents. The prioritized list is, however, not stagnant. The entire collections process, and the computing system performing the steps necessary to generate a prioritized list of customers requiring collection activity may be optimized using machine learning or artificial intelligence in real time as collection activities proceed and subsequent generations of prioritized lists are created. Prioritized lists can also be created in real time as well as based on user request.

The computing system will monitor the accounts receivable status of one or more collection customers over multiple time intervals, as collection activities progress. The monitored accounts receivable status can then be used to train a machine learning algorithm to identify a positive trend or a negative trend in the accounts receivable status of selected customers. The identification of a positive or negative trend will be more specifically based upon analysis of one or more of the direct ranking variables or the derived ranking variables over time. The trained machine learning algorithm can be executed to autonomously identify a positive trend or a negative trend in the accounts receivable status of selected customers.

In addition, the machine learning algorithm can be trained to execute changes to the formula used to calculate the derived ranking variables, the model, the weightings used in the model and/or other inputs used to calculate the collections impact score, with additional changes being premised upon the positive trend or the negative trend in the accounts receivable status of selected customers. This process may be repeated over many iterations such that the system, and in particular the machine learning algorithms embedded in the system, optimize the generation of prioritized lists of collection customers based upon actual measured collections results.

The direct ranking variables analyzed by the computing system as the machine learning algorithm is trained can include total past due amount, A/R (Accounts Receivables) aging, customer risk profile, past promise to pay violations, open receivables amount, disputed receivables amount, open promise to pay amount, past due invoice count, upcoming past due amount, and the like. Each of these variables is defined specifically below.

The derived ranking variables analyzed by the computing system as the machine learning algorithm is trained can include weighted clean past due amount, weighted promise to pay violations, weighted customer risk profile, weighted customer credit risk, weighted average days payment late, weighted upcoming past due amount, and similar derived data. Specific examples of the calculation of the derived ranking variables are described in detail below.

Several advantages may be realized by implementing the embodiments summarized above and described in detail below. For example, the collections impact score and the ordering of the prioritized list are created by data and analytics-driven machine learning processes utilizing collections and account receivable data collected over time. The resulting output is not stagnant. The machine learning modules included in the system constantly monitor and update the input data and model to assure that the current prioritized list of collection customers is optimized for each collection department or each collection analyst. The monitoring is done at real-time or at periodic intervals. Thus, collection results can be significantly enhanced versus the results obtained using a customer list prioritized by human judgment.

Other embodiments disclosed herein include a computer-implemented method of generating a series of sets of collection worklists. Each collection worklist in a set is created for one collection agent. Consecutive sets of collection worksheets may be created in a series over any selected time interval, for example weekly, daily, or monthly. Typically, a collection agent will be an individual, however, a collection agent may also be a collection team comprising several individuals or an automated process for collection customer contact. In some instances, daily sets of collection worklists and weekly sets will be prepared in overlapping time periods. Alternatively daily work lists may be accumulated into weekly work lists, or other time intervals may similarly be combined.

The generation of a set of collection worklists for a selected time interval can include the following steps, each of which is described in greater detail below:

Inputting a plurality of data inputs to the computing system by;

obtaining a list of multiple collection customers, ordered according to a prioritized need for collection activity;

obtaining a list of the plurality of collection agents;

assigning a time available for each collection agent to perform collection actions within the time interval;

entering a list of the collection actions; and associating a collection action duration with each of the collection actions.

Generating the collection worklist set for one time interval by processing the plurality of data inputs with the computing system by;

calculating a collection action distribution, wherein the collection action distribution comprises a time allocation of the collection actions over a time interval;

calculating an initial cadence, based upon the time available for each collection agent to perform collection actions within the time interval, and based upon the collection action distribution;

creating an action assignment based upon the initial cadence and by assigning one of the collection customers to each of the collection actions on the initial cadence, based at least in part upon the prioritized need for collection activity;

generating an individual collection worklist for each collection agent from the action assignment; and delivering the collection worklist for each collection agent to each collection agent.

Ultimately, the collection worklist will inform and guide the collection activities undertaken by collections agents. The collection worklist is not stagnant, however. The entire collections process, and the computer system performing the steps necessary to generate a set of collection worklists may be optimized using machine learning or artificial intelligence in real time as collection activities proceed and subsequent generations of collection worklists are created. For example, a change to a collection action duration, or a collection activity distribution may be input, preferably through machine learning or artificial intelligence as described below, and directly affect the productivity of the collection agents.

The computing system will therefore monitor one or more collection agent productivity metrics over multiple time intervals, as changes are made to the inputs used by the computer to generate collection worklists. The monitored collection agent productivity metrics can then be used to train a machine learning algorithm to identify a positive trend or a negative trend in the productivity of the collection agents. The identification of a positive or negative trend will be more specifically based upon analysis of data including but not limited to a number of customers contacted by one or more collection agents during a time interval, an amount collected during a time interval, changes in the account receivable status of a customer, feedback from one of the collection agents, feedback from a collection agent manager, or similar performance-related metrics.

The trained machine learning algorithm can be executed to autonomously identify a positive trend or a negative trend in the collection agent productivity metrics. In addition, the machine learning algorithm can be trained to execute additional changes to the collection action duration, or a collection action distribution model, with additional changes being premised upon the positive trend or the negative trend in the collection agent productivity metrics. This process may be repeated over many iterations such that the system, and in particular the machine learning algorithms embedded in the system, optimize the generation of collection worklists based upon actual measured collections results.

In some embodiments, the generation of one or more collection worklists can be modified based upon user input. It is not uncommon for collections departments to assign a portfolio of collection customers to each collection agent. The portfolio collection customers may be based upon various logical allocation strategies. For example, collection customers in a specific geographic region such as the East Coast, the United States, Europe etc. may be assigned to one or more collection agents. Alternatively, collection customers may be grouped by size or industry. Therefore, the step of assigning a customer to each of the collection actions on the individual action distribution of a collection agent can be based in part upon an existing customer allocation or portfolio management strategies.

In addition, some collection customers will identify preferred contact methods. For example, one collection customer may only accept contact by telephone, while another collection customer only accepts contact by email. Therefore, the step of assigning a customer to each of the collection actions on the individual action distributions may additionally be based upon a preferred customer contact method.

As noted above, sets of collection worklists may be generated across overlapping time intervals. For example, a primary set of worklist may be generated on a daily basis with an overlying weekly set of worklists being generated from the daily work list, or intermediate documentation. In such an embodiment, a user, or the machine learning algorithm, can defer assignment of a collection customer or a collection action to a worklist prepared for a subsequent day, week, or subsequent time period. In this way, high priority collection customers can be assigned to a collection action that is most likely to achieve positive results based upon the positive trend or the negative trend in the plurality of collection agent productivity metrics identified by the machine learning algorithm.

Several advantages may be realized by implementing the embodiments summarized above and described in detail below. For example, the collection worklists are created by data and analytics-driven machine learning processes utilizing collection agent productivity metrics collected over time. The resulting output is not stagnant, the machine learning modules included in the system constantly monitor and update the input data and models to assure that the most current collection worklists are optimized for each collection agent, and to facilitate the most efficient collection process possible. Thus, collection results can be significantly better than the results obtained using a worklist prioritized by human judgment.

The following portions of this detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, accounts receivable management technology, collections management technology, data entry technology, machine learning technology, and/or the like. In other aspects, certain embodiments can improve the functioning of user equipment or systems themselves (e.g., accounts receivable management technology, collections management technology, machine learning technology, etc.).

For example, by, improving the speed and accuracy of the user equipment to generate, potentially in real-time, collection customer lists prioritized based upon a need for collection action, and/or to generate collection agent worklists. For instance, the following steps may be performed in real-time as inputs are received into a system: calculating one or more derived ranking variables from the one or more direct ranking variables, applying a weighting to the direct ranking variables and the derived ranking variables to create weighted direct ranking variables and weighted derived ranking variables, calculating a collections score for each of the collection customers, and generating the prioritized list of the collection customers. Similarly, the following additional steps can be performed by a computing system in real time as inputs are received into a system: associating a collection action duration with each of the collection actions, calculating a collection action distribution, calculating an initial cadence, calculating an action assignment based upon the initial cadence, assigning one of the collection customers to each of the collection actions on the action assignment, and assigning one of the collection customers/collection action items on the action assignment to collection agents to generate the worklist for each collection agent.

To the extent any abstract concepts are present in the various embodiments, those concepts can be implemented as described herein by devices, software, systems, and methods that involve specific novel functionality such as calculating one or more derived ranking variables from the one or more direct ranking variables, applying a weighting to the direct ranking variables and the derived ranking variables to create weighted direct ranking variables and weighted derived ranking variables, calculating a collections score for each of the collection customers, and generating the prioritized list of the collection customers. Similarly, the following additional steps can be performed by a computing system in real time as inputs are received into a system: associating a collection action duration with each of the collection actions, calculating a collection action distribution, calculating an initial cadence, calculating an action assignment based upon the initial cadence, assigning one of the collection customers to each of the collection actions on the action assignment, and assigning one of the collection customers/collection action items on the action assignment to collection agents to generate the worklist for each collection agent.

These particular steps, to name a few examples, extend beyond mere conventional computer processing operations.

These functionalities can produce tangible results outside of the implementing computer system, including, merely by way of example, tangible prioritized collection customer lists and tangible collection agent worklists. Embodiments feature automatic training of machine learning algorithms based on specific business context, for example collection agent productivity metrics, collections customer accounts receivable status and/or the like, at least some of which may be observed or measured by users of the computing system, customers, and/or service providers.

Various modifications and additions can be made to the embodiments discussed without departing from the scope of the invention. For example, while the embodiments described herein refer to particular features, the scope of this invention also includes embodiments having different combinations of features and embodiments that do not include all of the described features.

SPECIFIC EXEMPLARY EMBODIMENTS

I. Ranked List of Collection Customers

We now turn to the embodiments as illustrated by the drawings. FIGS. 1-8 illustrate some of the features of methods, systems, and apparatus for the generation, visualization, and optimization of ranked collection customer lists. FIGS. 1-8 also illustrate some of the features of the methods, systems, and apparatus for the generation, visualization and optimization of personalized collections agent worklists.

The methods, systems, and apparatuses illustrated by FIGS. 1-8 refer to examples of different embodiments that include various components and steps, which can be considered alternatives, or which can be used in conjunction with one another in the various embodiments. The description of the illustrated methods, systems, and apparatuses shown in FIGS. 1-8 is provided for purposes of illustration and should not be considered to limit the scope of the different embodiments.

FIGS. 1 and 2 are flowchart representations of computer-implemented methods, 100 and 200 respectively, of generating a series of prioritized lists of collection customers requiring collection activity. The prioritized lists can be generated at selected time intervals, for example daily, weekly, or monthly. The prioritized list of collection customers requiring collection activity can be delivered from a computing system to a collection agent, and can serve in part to guide, optimize, inform, or otherwise direct the order or priority of collection activities undertaken by a collection agent. The goal of a collection agent is positive collection results which can be measured by the amount collected, the number of open invoices closed, the age of open invoices successfully closed, or other similar metrics.

Collectively these metrics and others can be referred to as positive collection outcomes. The prioritized list generated according to methods 100 and 200 are based upon analysis of customer data relating to accounts receivable status collected and analyzed over time. As described in detail below, analysis can be executed by machine learning algorithms such that the speed of delivery and accuracy of the prioritized list is optimized. Specifically, the ranking of collection customers is optimized such that contacting those customers highest on the list is most likely to generate desirable positive collection outcomes.

The method 100 of FIG. 1 begins with the receipt into a computing system of a collection customer list. (Step 102). The collection customer list will include all, or a subset of the collection customers maintained by an entity with a collections department. Logical subsets of collection customers might be organized by region, industry, account size, subsidiary, or other criteria. Typically, the collection customer list will be maintained in one or more databases utilized by financial management personnel. For example, it is common for a collection customer list to be maintained in an accounts receivable ("AIR") database maintained as part of an entity's billing and collections or other financial management software suite.

The collection customer list may be input manually by a user. More typically, the collections customer list will be automatically generated, retrieved, or downloaded from the appropriate database. Customer data related to A/R status is likely to be maintained in the same database or databases. Alternatively, customer data related to A/R status may be maintained in different databases or maintained by different software suites that the collections customer lists. Customer data related to A/R status may be downloaded, input by user, or otherwise made available to the systems described herein. (Step 104).

Representative examples of customer data related to A/R status includes but are not limited to total past due amount across all invoices, A/R aging categorized by time period, i.e. 30 days past due, 60 days past due, 90 days past due and the like, customer risk profile i.e. credit worthiness and history, past promise to pay violations, open receivables amount, disputed receivables amount, open promise to pay amount, past broken promise to pays, past due invoice count, disputes count, upcoming past due invoices/amounts, and other customer data related to A/R status. Some or all this customer data may be input to the system for processing to generate a prioritized collection customer list. (Step 104). As described in detail with respect to method 200, FIG. 2 below, the collections customer list and customer data relating to A/R status are analyzed using a ranking engine. (Step 106). The ranking engine includes computer hardware and software configured to autonomously process input data and generate a prioritized collection customer list as described herein. Thus, the ranking engine performs various automated, and/or user directed, processes as described in detail with respect to method 200. The output of the ranking engine is a collection impact score for each collection customer on the collection customer list. (Step 108).

The system may then generate a prioritized list of the collection customers ordered according to the calculated collection impact score for each customer. (Step 110). If desired, the system may include manual overrides to make user adjustments to the prioritized list. Periodically, for example daily, weekly, or monthly, the prioritized list of collection customers is delivered to collection agents who may then undertake collection activity based at least in part upon the ordering on the prioritized list. (Step 112). As used herein a collection agent may be an individual. Alternatively, a collection agent may be a software module or interface configured to directly contact a collection customer to make automated collection efforts. Alternatively, a collection agent may be a team of individuals, or a team comprised of individuals and software configured to contact collection customers and undertake collection activities.

The generation of a collection impact score for each collection customer and the formulation of a prioritized list is not a static activity. Specifically, the disclosed systems and software are configured to monitor customer data from the various A/R (Accounts Receivables) databases or information sources described above to determine one or more collection customer's A/R status as it evolves over multiple time periods. (Step 114). The system and software embodiments described herein include machine learning modules having algorithms which may be trained to identify trends in the A/R status of one or more collection customers over time. (Step 116). As described in detail with respect to method 200, the data used to train the machine learning modules includes but is not necessarily limited to total past due amount across all invoices, A/R aging categorized by time period, i.e. 30 days past due, 60 days past due, 90 days past due and the like, customer risk profile i.e. credit worthiness and history, past promise to pay violations, open receivables amount, disputed receivables amount, open promise to pay amount, past broken promise to pays, past due invoice count, disputes count, upcoming past due invoices/amounts, and other customer data related to A/R status, and additional data derived from the raw A/R data noted above.

After initial training, the machine learning algorithm(s) can be used to identify trends in the A/R status of one or more collection customers. The machine learning algorithm (s) may identify positive trends in the A/R status across multiple customers, although negative trends can also be informative to subsequent processes. Specifically, the machine learning algorithm(s) can be used to directly implement changes to the data processing steps utilized by the ranking engine to optimize the generation of subsequent prioritized collection customer lists. (Step 118). More detail concerning the optimization process is included in method 200. Furthermore, the machine learning algorithm(s) may output suggestions for a user to input to the ranking engine, or the machine learning algorithm(s) may directly control the ranking engine.

The foregoing processes may be repeated over selected time periods, for example daily, weekly, monthly, or the like. (Step 120). Thus, the machine learning module(s) are repetitively retrained and re-utilized to enhance effectiveness of the ranking engine and to ensure that each generation of a prioritized list of collection customers is (A) optimized to support efficient collection activities and (B) adapted to the most current A/R status of the collection customers.

Figure 2A:
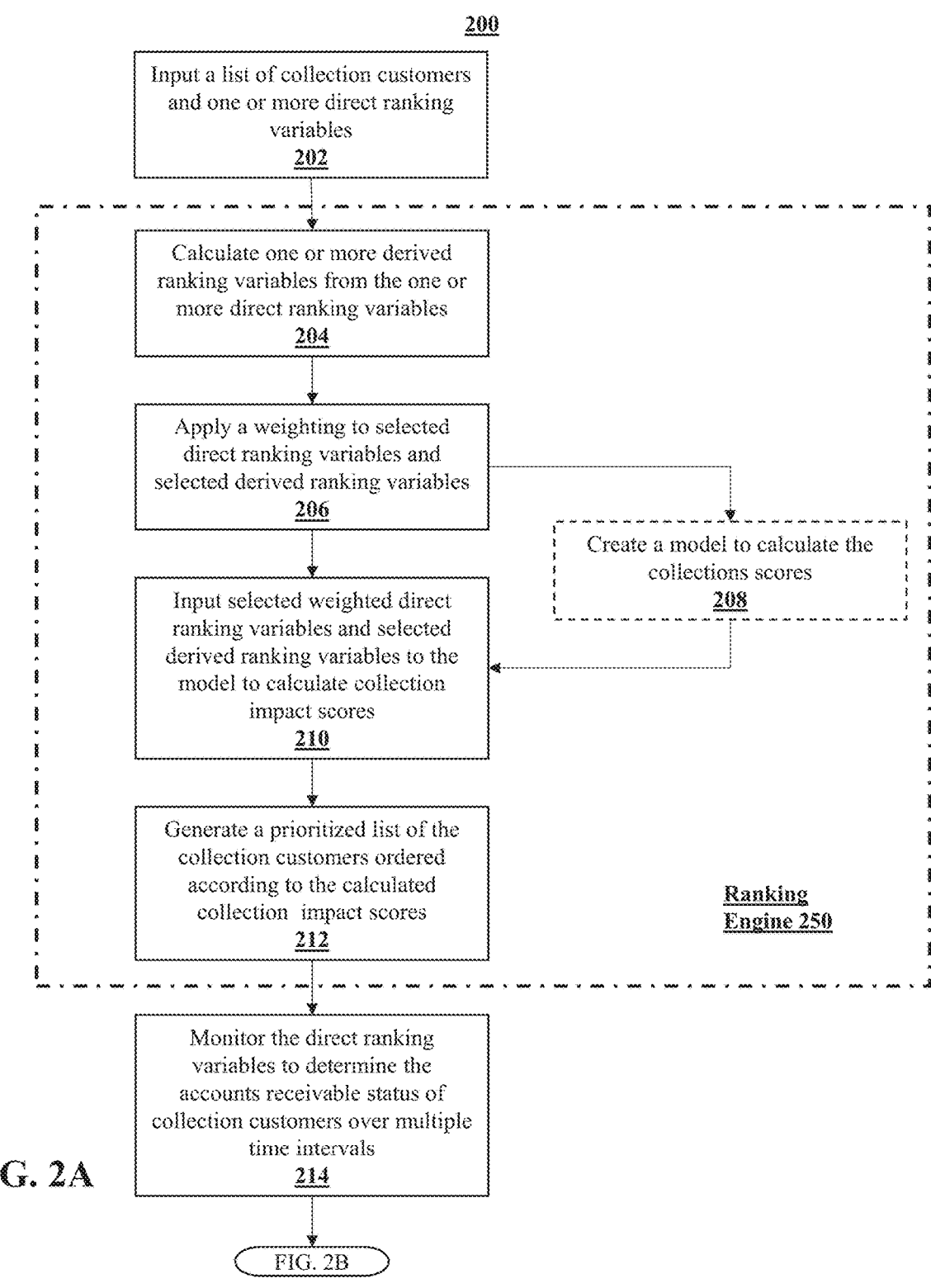

FIGS. 2A and 2B (collectively FIG. 2) illustrate a more detailed embodiment of the steps utilized to generate and optimize a prioritized list of collection customers. Method 200 includes several steps, specifically, steps 204, 206, 208, 210, and 212 which are performed in the ranking engine noted above. The steps performed in the ranking engine are identified on FIG. 2A as being included within ranking engine 250.

Method 200 includes the collection, user input, or downloading of a list of collection customers and one or more direct ranking variables. (Step 202). The direct ranking variables include any sort of metric, measurement, or other customer data related to the A/R status of a collection client. Representative direct ranking variables include but are not limited to total past due amount across all invoices, A/R aging categorized by time period, i.e. 30 days past due, 60 days past due, 90 days past due and the like, customer risk profile i.e. credit worthiness and history, past promise to pay violations, open receivables amount, disputed receivables amount, open promise to pay amount, past broken promise to pays, past due invoice count, disputes count, upcoming past due invoices/amounts, and other customer data related to A/R status.

Representative definitions of selected direct ranking variables include the following:

Total Past Due Amount—Past due refers to a payment that has not been made against an invoice by the end of its due date. The total past due amount is the sum of open amounts across all invoices that are past the due date.

A/R (Accounts Receivables) Aging—A/R aging is the process of categorizing open accounts receivables based on the length of time an invoice has been outstanding. Typically, business entities will group the invoices into aging groups, for example, current Due, 1-30 days past due, 31-60 days past due, etc.) and calculate the total open amount across each aging group.

Customer Risk—Customer risk is the assessed risk of default on open receivables that may arise from a customer failing to make required payments. Customer risk is generally determined by looking at a combination of various parameters including but not limited to credit score, other credit information, customer size, industry, length of relationship, length of time in business, and the like. Customer risk may also be categorized into various groupings (e.g. High Risk, Medium Risk, Low Risk). This information is generally maintained in the enterprise resource planning (ERP) database maintained for each collection customer.

Open Receivables Amount—Open Receivables are invoices that are not past due yet. The total open receivables amount is the sum of the open receivables amount for all open receivables.

Total Disputed Amount—Disputed Receivables are the invoices that have been disputed by a collection customer due to any perceived discrepancy. Generally, disputed receivables require additional supporting documents to resolve the dispute and the resolution would be either to write off the dispute or give a credit for the dispute. The total disputed amount is the sum of the open amounts of all disputed receivables.

Total Open Promise to Pay Amount—A promise to pay is a commitment made by the collection customer to make a payment against a set of receivables on a future date. An open promise to pay is a payment commitment that is set for a future date. The total open promise to pay amount is the sum of the open amounts of all open promises to pay.

Broken Promise to Pays—A broken promise to pay is a payment commitment that has not been honored by the collection customer against a past promise to pay commitment.

Upcoming Past Due—Upcoming Past Due is defined as the sum of all open receivables that will be past due in an upcoming defined time period, for example, within the next 15 days.

The foregoing, and similar, direct ranking variables can be manipulated according to formulas to create or calculate derived ranking variables (Step 204). The derived ranking variables are calculated by the ranking engine according to parameters set by the user or set by the machine learning algorithm(s) as described below. Representative derived ranking variables include but are not limited to:

Weighted Average Days Late (WADL)—Weighted Average Days Late (WADL) is the average number of days that invoices are late, weighted by their open amount. For example:

> WADL=(Sum of (each invoice amount*each invoice days paid late))/(Sum of ALL invoice amounts).
> To get a more accurate assessment of WADL, outliers can be removed during the calculation of WADL.

Weighted Clean Past Due—A Clean Past Due (CPD) invoice is an invoice that is not disputed and that doesn't have an open promise to pay. Weighted clean past due (CPD-W) is defined as the clean past due amount weighted by the number of days late. For example:

> WCPD=Clean Past Due Invoice Amount*Days past due.

Promise to Pay Violations—Promise to Pay Violations (P2P-V) is defined as the number of "open" invoices that have a broken promise to pay on a given date. For example:

P2P-V=Number of "open" invoices that have a broken promise to pay on a given date.

The above illustrated representative derived ranking variables are not limiting upon the scope of this disclosure. Other derived ranking variables can be calculated from direct ranking variables or other customer data.

Within the ranking engine 250, a combination or subset of all possible direct ranking variables and derived ranking variables is selected, and then weighted (Step 206) for input to the ranking engine model for processing (Step 208). As noted above, the output of the model from the ranking engine 250 is initially a collection impact score for each collection customer. The model utilized to calculate a collection impact score may be of any useful mathematical or logical type, for example a linear regression model may be used to calculate collection impact scores. One representative example of a weighted model which can be implemented in the ranking engine to calculate collection impact scores is:

$$\text{Collection Impact Score}=0.45*\text{WCPD-N}+ \\ 0.25*\text{P2PV-N}+0.15*\text{Risk-N}+0.10*\text{WADL-N}+ \\ 0.05*\text{UPD-N}$$

Where:
  WCPD-N: Weighted Clean Past Due Amount—Normalized
  P2PV-N: Promise to Pay Violations—Normalized
  Risk-N: Customer Credit Risk—Normalized
  WADL-N: Weighted Average Days Late—Normalized
  UPD-N: Upcoming Past Due—Normalized Each variable input into the model is weighted by an appropriate weighting factor, in the example above the weighting factors being 0.45, 0.25, 0.15, 0.10, and 0.05 respectively.

One representative, but highly simplified example of the calculation of a small set of collection impact scores according to the above weighted model follows. This example assumes 5 customers with Weighted Average Days Late (WADL) scores as follows:

TABLE 1

| Customer | WADL (Weighted Average Days Late) |
|---|---|
| Cust #1 | 6 days |
| Cust #2 | −2 days |
| Cust #3 | 25 days |
| Cust #4 | 3 days |
| Cust #5 | 15 days |

A Normalized WADL Score (between 0-100) can be assigned to every customer based on the linear normalization of the WADL shown above in Table 1. This Normalized WADL is calculated in the range of 0 to 100 where 0 is assigned to the lowest WADL and 100 is assigned to the highest WADL and every other value in between is spread linearly. For example:

TABLE 2

| Customer | WADL | WADL-N (Weighted Average Days Late-Normalized) |
|---|---|---|
| Cust #1 | 6 days | 50 |
| Cust #2 | −2 days | 0 |

TABLE 2-continued

| Customer | WADL | WADL-N (Weighted Average Days Late-Normalized) |
|---|---|---|
| Cust #3 | 25 days | 100 |
| Cust #4 | 3 days | 25 |
| Cust #5 | 15 days | 75 |

Similarly, normalized scores can be calculated for each of the direct ranking variables and derived ranking variables selected to input into the model and create the collection impact (CLS) scores. (Step 210). For example:

TABLE 3

| Customer | WCPD-N | P2PV-N | Risk-N | WADL-N | UPD-N | CLS Score |
|---|---|---|---|---|---|---|
| Cust #1 | 62 | 25 | 50 | 50 | 50 | 49.15 |
| Cust #2 | 0 | 0 | 0 | 0 | 25 | 1.25 |
| Cust #3 | 27 | 50 | 50 | 100 | 0 | 42.15 |
| Cust #4 | 16 | 75 | 100 | 25 | 75 | 47.2 |
| Cust #5 | 100 | 0 | 100 | 75 | 100 | 72.5 |

Method 200 continues with the generation of a prioritized list of the collection customers ordered according to the calculated collection impact scores. (Step 212). For example:

TABLE 4

| Customer | WCPD-N | P2PV-N | Risk-N | WADL-N | UPD-N | CLS Score | CLS Rank |
|---|---|---|---|---|---|---|---|
| Cust #1 | 62 | 25 | 50 | 50 | 50 | 49.15 | 2 |
| Cust #2 | 0 | 0 | 0 | 0 | 25 | 1.25 | 5 |
| Cust #3 | 27 | 50 | 50 | 100 | 0 | 42.15 | 4 |
| Cust #4 | 16 | 75 | 100 | 25 | 75 | 47.2 | 3 |
| Cust #5 | 100 | 0 | 100 | 75 | 100 | 72.5 | 1 |

As detailed below, the model and data input into the model can be modified, adjusted, or optimized by a user or more particularly by the machine learning algorithm(s) to enhance the accuracy and utility of the prioritized list, specifically to enhance the ranking of collection customers such that contacting those customers highest on the list is most likely to generate positive collection outcomes. In the simplified example above, the order on the prioritized list of collection customers would be Cust #5 (CLS Rank 1), Cust #1 (CLS Rank 2), Cust #4 (CLS Rank 3), Cust #3 (CLS Rank 4), and Cust #2 (CLS Rank 5). Thus, in this highly simplified example Cust #5 should be the first collection customer to be contacted by a collection agent followed by others in order.

In addition, the steps of optimizing the prioritized list described below ensure that the prioritized list remains current as the A/R (Accounts Receivables) status of the collection customers changes over time. As noted with respect to method 100 of FIG. 1, the prioritized list is delivered to collection agents who then utilize the prioritized list to inform or direct subsequent collection activities.

Some or all the direct ranking variables may be monitored by the system over multiple time intervals (Step 214). Monitoring the direct ranking variables or other customer data may progress autonomously using appropriate software modules with or without direct user interaction. For example, a system user may manually enter the payment of a series of open invoices by a specific collection customer. Alternatively, the system may autonomously note payment on open invoices based upon A/R (Accounts Receivables) data collected and maintained in other databases. The payment on the series of open invoices by a specific collection customer will typically occur after an iteration of the prioritized collection customer list was generated, delivered to collection agents, and after collection activities had been undertaken, but before a subsequent prioritized list of collection customers is generated and delivered to collection agents. Thus, the direct ranking variables utilized in the ranking engine 250 are constantly changing over time.

Method 200 includes the additional step of training a machine learning algorithm to identify positive or negative trends in the A/R (Accounts Receivables) status of one or more collection customers. (Step 216). The direct ranking variables collected over time can be correlated with collection customer A/R (Accounts Receivables) status collected over time to identify positive or negative trends. As used herein, a positive trend is one which manifests as a decrease in the overall outstanding A/R of a given collection customer, or group of collection customers. The machine learning algorithm(s) can then be executed continuously or periodically to identify positive or negative trends in the A/R status of various collection customers. This data can be analyzed within the system to and used to optimize the generation of future priority ranked lists of collection customers.

For example, the machine learning algorithm(s) may be trained (step 220) and then executed to create a change to the formula used to calculate the one or more derived ranking variables utilized in the model to calculate collection impact scores. (Step 222). The formula may be modified by the machine learning algorithm(s), or by a user at the direction of the machine learning algorithm(s). Typically, modification will occur between iterations of the generation of a priority ranked list of collection customers. The input to the machine learning algorithm(s) can include current direct ranking variables, current derived ranking variables, and the trends in the account receivable status of one or more collection customers identified by the machine learning algorithm(s). The changed formula is then used to calculate one or more of the derived ranking variables to be input to the model at Step 204 and utilized in the ranking engine 250 to calculate collection impact scores for subsequent iterations of the priority ranked list of collection customers. (Step 224). This process may be repeated iteratively over an extended period such that the utility of the priority ranked list of collection customers is optimized as reflected in positive collection results which in turn are reflected in the trends identified by the machine learning algorithm(s) at Steps 216 and 218.

Alternatively, the machine learning algorithm(s) may be trained (step 226) and then executed to create a change to the model used in the ranking engine 250 to calculate the collection impact score. (Step 228). The model may be modified by the machine learning algorithm(s), or by a user at the direction of the machine learning algorithm(s), between iterations of the generation of a priority ranked list of collection customers. The input to the machine learning algorithm(s) can include current direct ranking variables, current derived ranking variables, and the trends in the account receivable status of one or more collection customers identified by the machine learning algorithm(s). The changed model used to calculate the collection impact score for various collection clients can then utilized in the ranking engine 250 at Step 210 to calculate collection impact scores for subsequent iterations of the ranked list of collection customers. (Step 230). This process may be repeated iteratively over an extended period of time such that the utility of the ranked list of collection customers is optimized as reflected in positive collection results which in turn are reflected in the trends identified by the machine learning algorithm(s) at Steps 216 and 218.

Alternatively, the machine learning algorithm(s) may be trained (step 232) and then executed to create a change to the weighting applied to the one or more direct or derived ranking variables utilized in the model to calculate collection impact scores. (Step 234). The weighting factor may be modified by the machine learning algorithm(s), or by a user at the direction of the machine learning algorithm(s), between iterations of the generation of a ranked list of collection customers. The input to the machine learning algorithm(s) can include current direct ranking variables, current derived ranking variables, and the trends in the account receivable status of one or more collection customers identified by the machine learning algorithm(s). The changed weighting can then be input to the model at Step 206 and utilized in the ranking engine 250 to calculate collection impact scores for subsequent iterations of the ranked list of collection customers. (Step 236). This process may be repeated iteratively over an extended period such that the utility of the ranked list of collection customers is optimized as reflected in positive collection results which in turn are reflected in the trends identified by the machine learning algorithm(s) at Steps 216 and 218.

II. Individualized Collection Worklists

Figure 3:
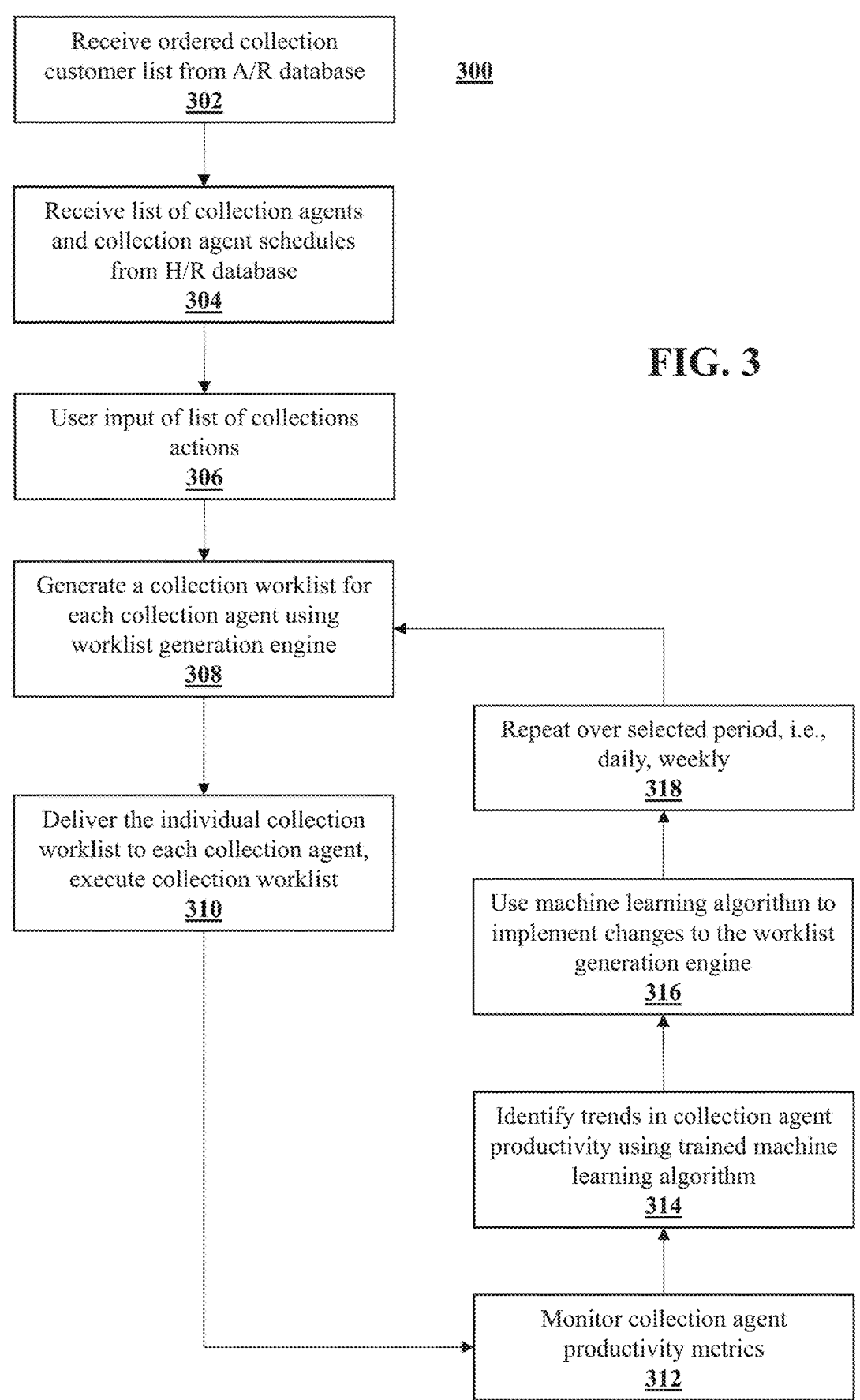
FIG. 3 is a flow diagram illustrating a method of generating individual collection worklists for collection agents.

FIGS. 3 and 4 are flowchart representations of computer-implemented methods, 300 and 400 respectively, of generating a series of sets of individualized collection worklists. A set of individualized collection worklists includes several individual collection worklists. Each individual collection worklist is specific to a collection agent. As used herein, a collection agent may be an individual. Alternatively, a collection agent may be a software module or interface configured to directly contact a collection customer to make automated collection efforts. Alternatively, a collection agent may be a team of individuals, or a team comprised of individuals and software configured to contact collection customers and undertake collection activities.

The sets of individualized collection worklists in a series are separated by regular or irregular time intervals. In some instances, sets of collection worklists are prepared simultaneously for overlapping time intervals, for example daily and weekly. The collection worklists can be delivered from the system to a collection agent, and can serve in part to guide, optimize, inform, or otherwise direct the collection activities undertaken by the collection agent. The goal of a collection agent is positive collection results which can be measured by the amount collected, the number of open invoices closed, the age of open invoices successfully closed, or other similar metrics. In addition, collection agent productivity can be measured by metrics including but not limited to the number of customers contacted during a given time interval, an amount collected during the time interval, an account receivable status of one or more customers, or feedback from collection agents or his or her collection supervisor.

The collections process includes a collection agent contacting a collection customer, ultimately to collect outstanding A/R (Accounts Receivables) amounts, open invoices, and the like. There are generally three major suggested actions that are typically performed by a collection agent during collection activities. Other less frequently utilized collection actions "Other Actions" exist. The three major collection actions are listed below in a generally recognized order of importance:

Telephone calls—directly placed telephone calls from a collection agent to a collection customer.

Personalized Emails—personalized and specifically tailored email correspondence from a collection agent to a collection customer Automated Emails Automated collection entails that must be given a relatively short review by a collections agent to ensure the email generation system is working properly and the content of the email is appropriate.

The individualized collection worklists prepared according to the methods 300 and 400 include collection actions paired to collection customers for a collection agent to contact over a given interval. The interval or worklist time period may be daily, weekly, both daily and weekly or another time period. Each collection worklist must therefore account for the likely time each collection action takes, collection agent bandwidth, and numerous other factors. The purpose behind the preparation of individualized collection worklists is enhanced collection agent productivity, leading to positive collection outcomes.

The method 300 of FIG. 3 begins with receipt of an ordered collection customer list. (Step 302). The ordered collection customer list may have been prepared according to method 100 or method 200 as described in detail above. Alternatively, the ordered collection customer list may have been prepared manually. In either case, the ordered collection customer list will typically have collection customers ranked from those that need the most immediate collection attention to those who need lesser amounts of collection attention. The ordered collection customer list may be obtained from an A/R (Accounts Receivables) database, collections database, or elsewhere.

In addition, the method 300 includes input of a list of collection agents and collection agent schedules from a database such as a human resources (H/R) database. (Step 304). This information will include, but is not necessarily limited to collection agent name, experience, daily, weekly or other time period working schedule, pending vacations, pending time off requests, special scheduling concerns, and the like. Additionally, the method 300 requires input of lists of collection actions. (Step 306). A representative, but non-exclusive, list of collection actions includes telephone calls, personalized emails, automated emails, and other.

The above data can be applied to a worklist generation engine as described in detail with respect to method 400, FIG. 4. (Step 308). The worklist generation engine or worklist engine includes computer hardware and/or software running on a system having a processor configured to generate collection worklists as described herein. The output of the worklist generation engine is an individualized collection worklist for each collection agent. The worklist may be delivered, typically as an active graphical user interface on each collection agent's computer desktop. The collection agent will then work through the collection actions detailed on his or her worklist. (Step 310).

As also described in detail with respect to method 400, the generation of a collection worklist is not a static process. Many entities with collection departments may have tens of thousands of collection customers and it is impossible for the collection agents to contact each collection customer daily or even weekly. Therefore, prioritization as described herein and contact deferral as described below may be incorporated into the system. Furthermore, the A/R (Accounts Receivables) status of any given collection customer changes as payment on open invoices is made, or other collection activities occur. Therefore, the collection worklist must be updated regularly, for example daily, weekly, or monthly, to remain current and useful for optimizing collection activities. Finally, the models used to prepare a collection worklist can be updated and optimized to enhance the likelihood that the collection worklist generation process most effectively improves collection agent efficiency, productivity, and ultimately generates positive collection results.

Returning to FIG. 3, the method 300 includes the periodic or continuous monitoring of collection agent productivity metrics as subsequent iterations of collection worklists are distributed and executed by collection agents. (Step 312). Representative indicia of collection agent productivity include but are not limited to the number of collection customers contacted during a time interval, an amount collected during a time interval, an account receivable status of a collection customer, or feedback from the collection agents or a supervisor.

Machine learning algorithms may be trained and executed to identify trends in the individual or aggregated collection agent productivity metrics. (Step 314). Alternatively, or in addition, machine learning algorithms can be trained and executed to identify trends in the A/R status of various collection customers. In any embodiment, the machine learning algorithms may be executed to implement changes to the worklist generation engine (Step 316). This process is described in detail below with respect to method 400.

The foregoing processes may be repeated over selected time periods, for example daily, weekly, monthly, or the like. (Step 318). Thus, the machine learning module(s) are repetitively retrained and re-utilized to enhance the effectiveness of the worklist generation engine to ensure that each generation of the collection worklist is (A) optimized to support efficient and highly productive collection agents who perform efficient and highly productive collection activities and (B) adapted to the most current collection agent scheduling concerns and/or the most current A/R (Accounts Receivables) status of the collection customers.

Figure 4A:
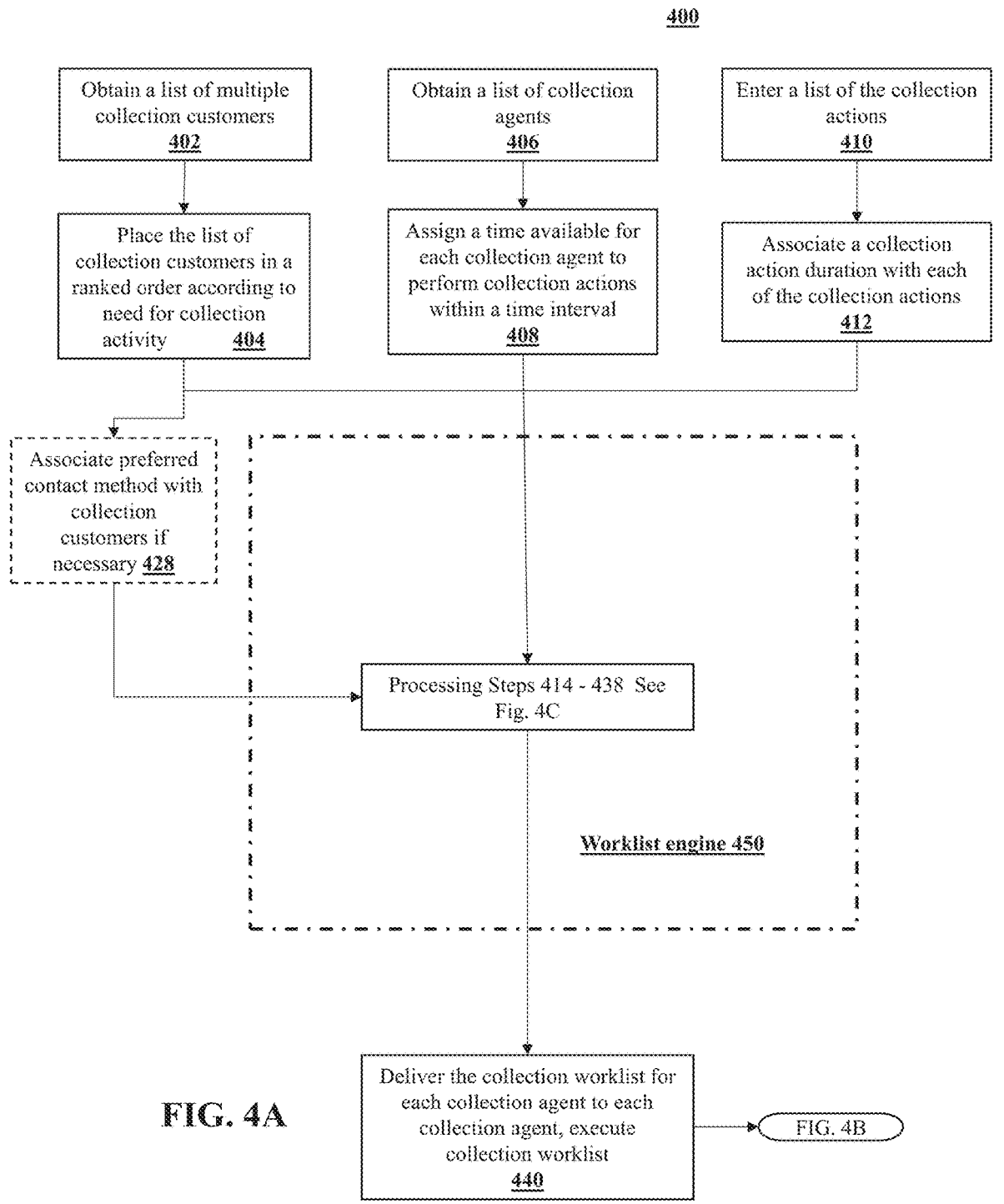
FIG. 4A, FIG. 4B, and FIG. 4C are a flow diagram illustrating an alternative method of generating individual collection worklists for collection agents.
Figure 4B:
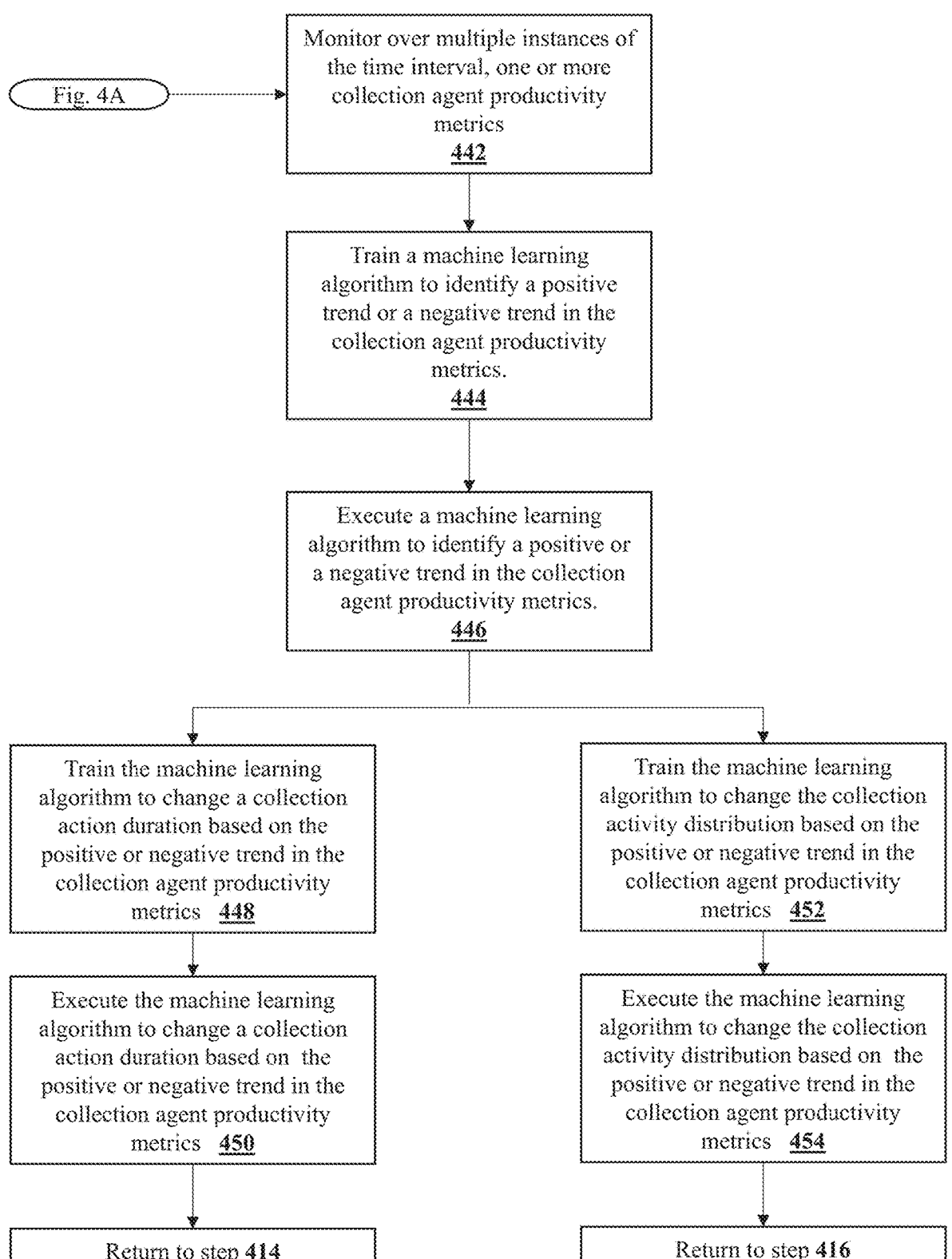
Figure 4C:
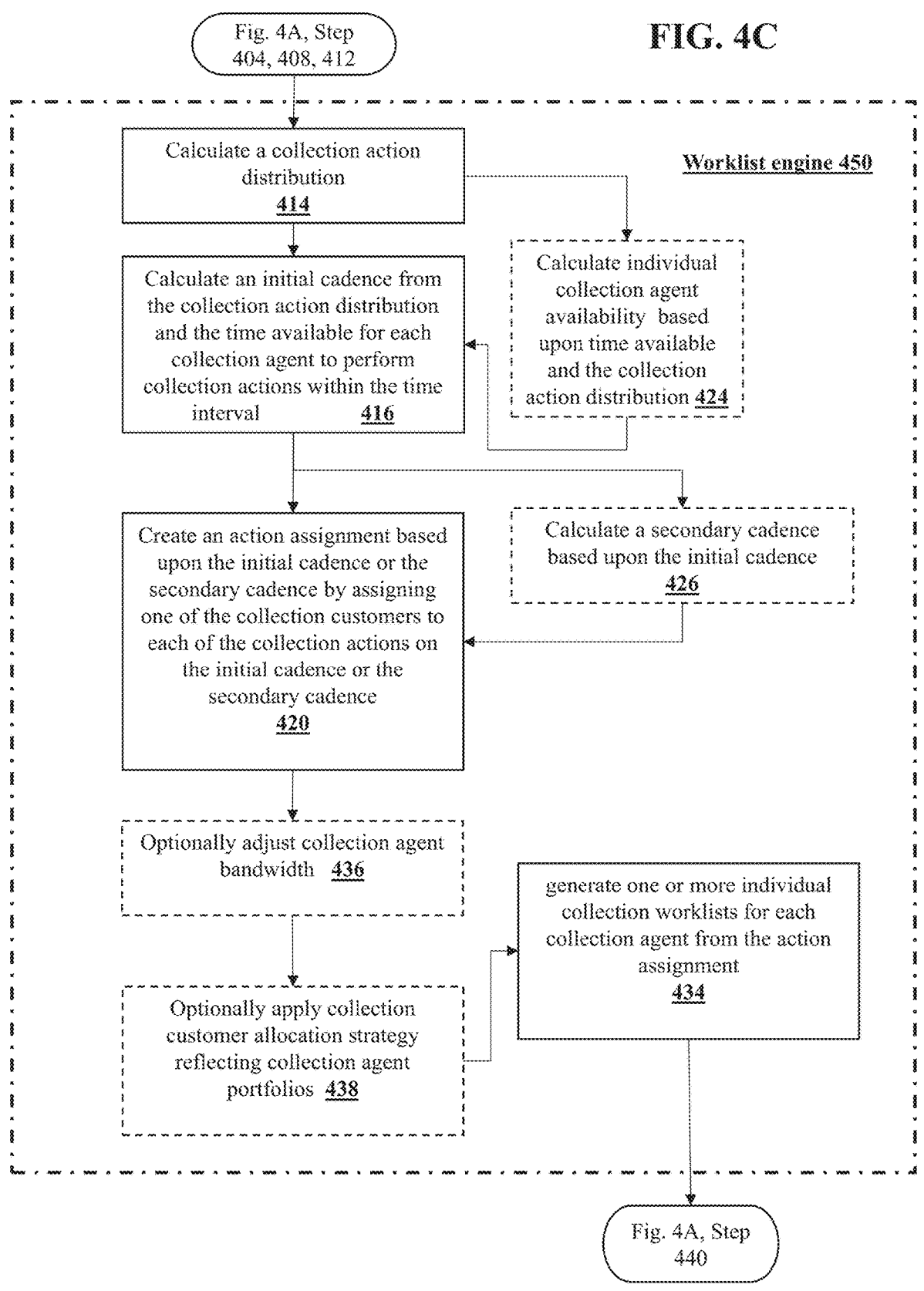

FIGS. 4A, 4B, and 4C (collectively FIG. 4) illustrate a more detailed embodiment of the steps utilized to generate and optimize individual collection worklists. Method 400 includes several steps including steps 414-438 which are performed by algorithms operating in the worklist engine of the computing system as noted above. The processing steps performed in the worklist engine are identified on FIGS. 4A and 4C as being included within worklist engine 450.

Method 400 includes initial steps to collect and process input data for the worklist engine 450. Initially, a list of multiple collection customers may be input from A/R (Accounts Receivables) records or elsewhere (Step 402). The list of collection customers may be placed in a priority ranked order according to the need for collection activity. (Step 404). The ranking of the collection customers may be processed autonomously according to method 100, method 200, or a similar method. Alternatively, the priority ranking of the collections customers may be handled by collection agents or collection agent managers manually.

In addition, a list of collection agents may be input to or accessed by the system (Step 406). A quantity of time available for each collection agent to perform collection actions during a given interval is associated with the identity of each collection agent. (Step 408). The time available for each collection agent to perform collection actions is also known as the collection agent bandwidth. Collection agent bandwidth is dictated primarily by the employment agreement with each collection agent detailing the number of hours each collection agent is expected to work per day, per week, or per other period. Special circumstances can limit the time available for a specific collection agent to perform collection activities as detailed below.

Additional input to the worklist engine 450 includes a list of collection actions, for example telephone calls, personalized emails, automated emails, or other. (Step 410). Furthermore, a collection action duration may be associated with each of the entered collection actions. (Step 412). For example, the worklist engine 450 may initially assume that telephone calls take 10 minutes, personalized emails take 6 minutes apiece, and the review of each automated email takes 1 minute.

The foregoing and potentially other data are processed in the worklist engine 450 according to the following representative but non-limiting steps. First a collection action distribution can be calculated or input. (Step 414). A representative collection action distribution is tabulated below.

TABLE 5

| Calls | Personalized Emails | Automated Email Review | Other Actions |
|---|---|---|---|
| 50% | 30% | 5% | 15% |

The collection action distribution is a preferred distribution of the relative time spent by a collection agent on the various collection actions previously input into the system. The collection action distribution can be tailored to specific collection agents, certain accounts, or otherwise altered to achieve efficiency. As detailed below, the collection action distribution can be optimized using machine learning as well.

The collection action distribution may be applied to the time available for each collection agent to perform collection actions within the selected time interval to create an initial cadence. (Steps 416 and 424). A cadence is the number of collection customers a team of collection agents can contact depending on the collective bandwidth for the agents across the team with the collection customer contacts being distributed according to the collection action distribution calculated above. A cadence may be calculated for any time interval, including, for example, daily, weekly, or monthly periods. As described in detail below, it can be advantageous for collection team flexibility to have cadences calculated for overlapping periods, including daily and weekly cadences.

A cadence for a given time interval can be initially calculated based upon individual collector bandwidth and the collection action distribution. (Step 416). For example, assuming a first collection agent works 40 hours per week, the number of collection actions that can be accomplished by this collection agent per day are:

Time per day=40 hrs/5=8 hours=480 mins

Time for Calls per day=50%*480=240 mins (refer to Table 5 above)

Time for Personalized Emails per day=30%*480=144 mins (refer to Table 5 above)

Time for Automated Email Review per day=5%*480=24 mins (refer to Table 5 above)

Time per Call=10 mins

Time per Personalized Email=6 mins

Time per Automated Email Review=1 min

Number of Calls per day=Time for Calls per day/Time per Call=240/10=24

Number of Personalized Emails per day=Time for Personalized Emails per day/Time per Personalized Email=144/6=24

Number of Automated Email Review per day=Time for Automated Emails per day/Time per Automated Email Review=24/1=24

This data can be calculated in the worklist engine for any number of collection agents (Step 424). In one highly simplified example, Table 6 below shows an initial cadence calculated for 4 collection agents using the collection action distribution of Table 5:

TABLE 6

| Collector | Hours/ Week | # Calls/ day | # Personalized emails/day | # Automated email reviews/day | Total Customer Contacts |
|---|---|---|---|---|---|
| Collector #1 | 40 | 24 | 24 | 24 | 72 |
| Collector #2 | 30 | 18 | 18 | 18 | 54 |
| Collector #3 | 20 | 12 | 12 | 12 | 36 |
| Collector #4 | 40 | 24 | 24 | 24 | 72 |
| Total | 130 | 78 | 78 | 78 | 234 |

The initial cadence shown above is calculated for one day. Thus, this data can be referred to as a daily cadence. The worklist engine 450 could assign collection customers to the collection actions on the daily cadence to create an action assignment as described below (Step 420). The action assignment is a tabulation of data associating collection clients from the priority ordered list with collection actions from a cadence. A representative action assignment is illustrated below in Table 9. One rule of client assignment implemented by the worklist engine 450 is to assign collection clients to collection actions based upon the need for collection action as reflected in the priority ranked list of collection clients. Thus, with respect to the daily cadence of Table 6, the worklist engine 450 could, according to this rule, assign the 78 highest ranked collection customers, based on need for collection activity, to receive telephone calls. The next 78 highest ranked collection customers, based on need for collection activity, would be assigned to receive personalized emails. The next 78 collection customers would be assigned to receive automated emails.

As detailed below, enhanced productivity can be achieved by modifying this simple daily need-based assignment process according to various practical and business considerations. Modification is advantageous or required because an entity may have many thousands of collection clients, many hundreds of whom require collection action at any given point in time. The number of collection clients requiring collection action each day, or even each week, may exceed the capacity of the collection agent team. Thus, more sophisticated client assignment rules are required to be implemented by the worklist engine 450 to ensure enhanced collection productivity.

For example, it can be advantageous to modify the daily cadence based upon a cadence calculated for a secondary time interval, for example a weekly cadence. (Step 426). A secondary cadence can allow the worklist engine 450 to "reserve" customers having the greatest need for collection action for a preferred collection action such as a telephone call on a later date. Thus, a weekly cadence permits reserving collection customers who would not be called on the first day for a telephone call rather than a personalized email, although the telephone call will be performed by a collection agent on a subsequent day.

A representative weekly cadence calculated from the daily cadence of Table 6 is:

TABLE 7

| Collector | # Calls/ week | # Personalized emails/week | # Automated email reviews/week | Total Customer Contacts |
|---|---|---|---|---|
| Collector #1 | 120 | 120 | 120 | 360 |
| Collector #2 | 90 | 90 | 90 | 270 |
| Collector #3 | 60 | 60 | 60 | 180 |
| Collector #4 | 120 | 120 | 120 | 360 |
| Total | 390 | 390 | 390 | 1170 |

The weekly cadence for this four-person collection agent team includes 1170 customer contacts rather than the 234 customer contacts included on the daily cadence. This allows the worklist engine 450 greater flexibility when assigning collection customers to collection actions based upon need for collection activity.

Other variations to the basic need-based collection customer assignment rules can also be advantageous. For example, certain collection customers may have identified a preferred contact method. (Step 428, FIG. 4A). A preferred contact method might be "telephone calls only," or "personalized emails only." Preferred contact method data can be associated with the list of multiple collection customers, or separately stored in a database accessible to the worklist engine 450. The worklist engine 450 can use any indicated preferred contact method to override the need-based customer assignments on an action assignment prepared from a daily cadence, a weekly cadence, or a cadence prepared for a different time interval.

For simplicity sake, in Table 8, collection customers with a preferred contact method are grouped together in the following representative priority ranked list:

TABLE 8

| Customer | Rank | # of Customers | Preferred Contact Method | Suggested Action |
|---|---|---|---|---|
| Cust 1# to Cust #30 | 1-30 | 30 | Blank | Blank |
| Cust #31 to Cust #40 | 31-40 | 10 | Email Only | Email |
| Cust #41 to Cust #400 | 41-400 | 360 | Blank | Blank |
| Cust #401 to Cust #440 | 401-440 | 40 | Call Only | Call |
| Cust #441 to Cust #10000 | 441-10000 | 9560 | Blank | Blank |
| Total | | 10000 | | |

In this example, collection customers 31-40 have a preferred contact method of "Email Only" and hence are associated with a suggested action of "Email" in the databases accessed by the worklist engine 450. Similarly, collection customers 401-440 have a preferred contact method "Call Only" and have been associated with the suggested action of "Call" in the databases accessed by the worklist engine 450.

The action assignment of Table 9 below utilizes the daily and weekly cadences illustrated above in Tables 6 and 7. The representative action assignment of Table 9 also utilizes the preferred contact method and prioritized collection customer list data represented in Table 8. In this highly simplified example, it is assumed there are 50 collection customers out of 10,000 total collection customers who have designated a preferred contact method. Each of these 50 customers will have appropriate preferred contact data associated with their information in the priority ranked list of collection customers. The remaining 9,950 collection customers will have a blank or "no preference" in the preferred contact method field.

The worklist engine 450 can then be programmed to assign a "Call" or an "Email" action to the collection customers in the order of ranking up to the number of telephone calls and number of emails identified in the weekly or secondary cadence, accounting for the preferred contact method of Table 8, to create the action assignment (Step 420). With respect to the secondary interval (weekly) cadence of Table 7, the worklist engine will assign 390 collection customers for telephone calls, 390 collection customers for personalized emails, and 390 collection customers for automated email reviews, subject to preferred contact methods.

In the collection customer list reflected in Table 8, the 390 highest ranked collection customers initially would be customers #1 to #390, however, when preferred contact methods are considered by the worklist engine, the selected collection customers for telephone calls are collection customer #1 to #30 plus collection customers #41 to #400, totaling 390 customers. Even though collection customers #31 to #40 are higher ranked based upon need for collection activity, they are not considered for calls as their preferred contact method is email. Similar assignment of the remaining collection customers ranked according to need for collection activity results in the following representative action assignment:

TABLE 9

| Suggested Action | Weekly Cadence | Customers | Ranks | # of Customers |
|---|---|---|---|---|
| Call | 390 | Cust #1-#30 | 1-30 | 30 |
| | | Cust #41-#400 | 41-400 | 360 |
| Sub-Total | 390 | | | 390 |
| Personalized Emails | 390 | Cust #31-#40 | 31-40 | 10 |
| | | Cust #401-#780 | 401-780 | 380 |
| Sub-Total | 390 | | | 390 |
| Automated Email Reviews | 390 | Cust #781-Cust#1170 | 781-1170 | 390 |
| Sub-Total | 390 | | | 390 |
| Total | 1170 | | | 1170 |

A collection worklist can be completed for each collection agent from the action assignment by assigning collection customers and associated collection actions from the action assignment to collection agents. (Step 434). In certain implementations, it may be desirable to adjust collection agent bandwidth prior to the step of worklist generation (Step 436). Bandwidth adjustment can be desirable to account for any shortfalls in daily actions due to collection agent overachievement and to ensure that all collection agents are fully utilized during a given time interval. For example, the representative worklist generation described below uses worklist engine 450 to adjust the collection agent bandwidth to twice the calculated daily capacity.

Typically, each collection agent will work with a preassigned portfolio of collection customer accounts. The portfolio of the collection customer accounts is usually assigned according to logical constructs including but not limited to geographic territories, similar industry accounts, large accounts, small accounts, high-value accounts and the like. Other considerations along with collection agent portfolios may be considered by the worklist engine 450 to make assignments of collection customer/collection action items to specific collection agents. Together any rules controlling assignments to specific collection agents are referred to as a customer allocation strategy. (Step 438).

Any applicable customer allocation strategy data may be maintained in a H/R (Human Resource) database, the A/R (Accounts Receivable) database, or another database accessible to the worklist engine 450. The collection customer/ collection action items from the action assignment that are assigned to each collection agent based upon his or her bandwidth, adjusted bandwidth, and/or any customer allocation strategy will form the personalized collection worklist for that collection agent (Step 434).

An adjusted daily cadence based upon Table 6 is shown below in Table 10. The adjusted daily cadence includes double the number of actions shown on the daily cadence of Table 6 to account for collection agent overachievement and to ensure that collection agents are working at full capacity.

TABLE 10

| | Calls/Day | Emails/Day | | |
|---|---|---|---|---|
| Collector | # Calls/day | # Personalized emails/day | # Automated email reviews/day | Total Customer Contacts |
| Collector #1 | 48 | 48 | 48 | 144 |
| Collector #2 | 36 | 36 | 36 | 120 |
| Collector #3 | 24 | 24 | 24 | 72 |
| Collector #4 | 48 | 48 | 48 | 144 |
| Total | 156 | 156 | 156 | 468 |

The action assignment (Table 9) identifies 390 collection customers for telephone calls. For the first period (typically the first daily period), the algorithms operating within the worklist engine 450 will assign 48 of the 390 "telephone call" collection customers from the action assignment to collection agent #1. Similarly, 36 of the 390 "telephone call" collection customers will be assigned from the action assignment to collection agent #2. In each case the collection customers will be assigned by the worklist engine 450 to a specific collection agent according to the customer allocation strategy applied by the worklist engine, if any. A similar process will be executed by the worklist engine to assign the first 156 collection client/personalized email items from the action assignment to collection agents 1-4, subject to any allocation strategy. A similar process will be executed by the worklist engine to assign the first 156 collection client/ automated email review items from the action assignment to collection agents 1-4.

A similar process will be executed by the worklist engine 450 to complete personalized collection worklists for the second interval (the second day). On day two, however, collection customer/telephone call items ranked 157-204 will be assigned to the collection agents according to any customer allocation strategy and so on until each of the 1190 collection customer/collection action items on the action assignment (Table 9) is distributed to a collection agent on one or more personalized collection worklists.

The collection worklist(s) for each collection agent may then be delivered to the appropriate collection agent, typically as a graphical user interface available on the collection agent's computer desktop. The agent may then work through and execute the collection actions shown on the collection worklist. (Step 440.) Individualized worklists may be prepared for any period or interval, for example, daily, weekly, or otherwise and updated automatically or manually as desired.

Several variations to the collection worklist generation methods 300 and 400 may facilitate more efficient collection activities and accommodate certain business concerns. For example, the above-described processes and methods 300 and 400 may be applied initially to only those collection customers who have been assigned to a specific collection agent pursuant to a customer allocation strategy. In this embodiment, all collection customers assigned to a specific collection agent as part of a customer allocation strategy are "assigned" collection customers." Unassigned collection customers are those that do not have a collection agent assigned to them as a part of the customer allocation strategy. Typically, any collection agent can contact these unassigned collection customers.

In one alternative embodiment, only assigned collection customers are initially placed on individual collection worklists, unassigned collection customers are placed on individual collection worklists in a separate step described below. Initially, unassigned collection customers will be ranked on the prioritized collection customer list based upon the need for collection activity. (Steps 302, or 402 and 404). The algorithms within the worklist engine 450 can be programmed to assign unassigned collection customers to specific collection agents on their individual collection worklists based upon their rank on the priority ordered list of collection customers. For example, if a specific collection agent has a collection customer with a rank of 300 assigned a telephone call action on a worklist prepared from only assigned collection customers, but an unassigned collection customer with a rank of 200 exists on the ordered collection customer list, the worklist engine can be configured to replace the assigned collection customer with a rank of 300 with the unassigned collection customer having a rank of 200. This process can be repeated until there are no unassigned collection customers with a higher rank than the assigned customers initially placed on the individual collection worklists prepared for all collection agents.

If individualized collection worklists are created based on the above described worklist generation algorithm(s) and there is a collection agent with an insufficient number of collection customers assigned to him or her, based on preliminary assignment according to the customer allocation strategy, the worklist generation algorithms operating in the worklist engine can remove all the collection agents whose capacity has been met with assigned collection clients, and rerun methods 300 or 400 on the remaining collection agents to assure that each collection agent's bandwidth, or adjusted bandwidth, is fully utilized.

The worklist engine 450 may also implement rules pertaining to collection agent absence, paid time off, vacation, or other considerations affecting the overall collection agent bandwidth for a collection team. For example, the worklist engine 450 may be programmed to reassign the collection actions for an absent collection agent to a supervisor or another collection agent. Alternatively, the worklist engine 450 may be programmed to not reassign the collection actions for an absent collection agent.

The worklist engine 450 may also implement rules pertaining to the frequency of collection customer contacts. The worklist engine 450 may therefore maintain a database of recent collection customer contacts along with contact timing rules. Thus, recently contacted collection customers may be removed from the ordered list of collection customers for a period of time, based upon the contact timing rules. Alternatively, selected collection customers may be manually deferred by collection agents based upon knowledge of recent contact.

As noted above, upon receipt of one or more collection worklists, each collection agent will execute the collection items listed on his or her worklist by undertaking the appropriate contact of a collection customer, as indicated on the worklist. The collection worklist will typically be delivered to a collection agent as a graphical user interface accessible on the collection agent's computer desktop. Certain information can be input to the worklist engine 450 by a collection agent through the graphical user interface. For example, collection agents may have the option to override any specific collection action based on known context or previous collection actions undertaken for a specific collection client.

To enable a smooth collection workflow, the following and other status information may be maintained on the collection worklist, particularly if the collection worklist is delivered to a collection agent as a graphical user interface:

Unresponsive—Yes/No. Set to "Yes" if there have been no payments after two contacts (call/automated email/ personalized email) are sent.

Mark as completed—Ability to mark that a non-system action has been completed by the collection agent (e.g. called and notes not taken, website upload of data, etc.)

Email Status—Undelivered/Delivered/Opened. To record if a personalized email/auto email was delivered or not and if the email was opened or not.

Days since last contact—To show the number of days back the customer was contacted on.

As noted above, the generation of a set of collection worklists is not a static process. In addition, one goal of preparing a regular series of collection worklists over designated time intervals is enhanced collection agent productivity. Accordingly, as shown in FIG. 4B, collection agent productivity metrics may be monitored by the system over multiple time intervals (Step 442). Monitoring of the collection agent productivity metrics may progress autonomously using appropriate software modules with or without direct user interaction. For example, the worklist engine 450 of a system may automatically log the number of collection customers contacted by any collection agent or group of collection agents over a selected time interval. Alternatively, the worklist engine 450 may accept input from one or more collection agents or a collection agent supervisor concerning collection agent productivity. In other instances, collection agent productivity may be derived indirectly by tracking trends in the accounts receivable status of one or more collection customers.

The collection and analysis of collection agent productivity data can occur after a set of collection worklists is generated, delivered to collection agents, and after collection activities have been undertaken, but before a subsequent sets of collection worklist are generated and delivered to collection agents.

Method 400 includes the additional step of training a machine learning algorithm to identify positive or negative trends in the collection agent productivity metrics input or logged as described above. (Step 444). The collection agent productivity metrics collected over time can be correlated with previously logged collection agent productivity metrics to identify positive or negative trends. As used herein, a positive trend is one which manifests as an increase in the overall productivity of one or more collection agents. The machine learning algorithm(s) can then be executed continuously or periodically to identify positive or negative trends in the collection agent productivity metrics of various collection agents. This data can be analyzed within the system to identify trends across larger groupings of collection agents which can then be used to optimize the generation of future collection worklists (Step 446).

For example, the machine learning algorithm(s) may be trained (Step 448) and then executed to change a collection action duration based on the positive or negative trend in the collection agent productivity metrics. (Step 450). The collection action durations may be modified by the machine learning algorithm(s), or by a user at the direction of the machine learning algorithm(s). Modification can occur between iterations of the generation of a set of collection worklists. For example, the collection action duration assigned to a telephone call may be decreased from 10 minutes to 9 minutes based upon increased collection agent productivity as identified by the machine learning algorithm(s). The changed collection action duration can then be used to calculate a revised collection at action distribution (Step 414) and utilized in the worklist engine 450 to calculate subsequent iterations of the collection worklists. (Step 434). This process may be repeated iteratively over an extended period of time, such that the utility of the collection worklists is optimized as reflected in positive collection agent productivity metrics which in turn are reflected in the trends identified by the machine learning algorithm(s) at Steps 448 and 450.

Alternatively, the machine learning algorithm(s) may be trained (Step 452) and then executed to change the ratio of collection actions in a collection action distribution, based on the positive or negative trend in the collection agent productivity metrics. (Step 454). The collection action distribution may be modified by the machine learning algorithm(s), or by a user at the direction of the machine learning algorithm(s). Modification can occur between iterations of the generation of a set of collection worklists. For example, the percentage of time assigned to a telephone call may be increased from 50% to 55% based upon increased collection agent productivity as identified by the machine learning algorithm(s). The changed collection action distribution can then be used to calculate revised initial cadences or secondary cadences (Steps 416 and 426) and utilized in the worklist engine 450 to calculate subsequent iterations of the collection worklists. (Step 434). This process may be repeated iteratively over an extended period of time, such that the utility of the collection worklists is optimized as reflected in positive collection agent productivity metrics which in turn are reflected in the trends identified by the machine learning algorithm(s) at Steps 448 and 450.

The methods 100, 200, 300, 400 and variations of these methods can be combined as desired to enhance overall collection efficiency. For example, the method 500 of FIG. 5 begins with receipt of a non-prioritized collection customer list. (Step 502). The collection customer list may then be prioritized according to method 100 or method 200 described in detail above. (Step 504). The ranked and ordered collection customer list will typically have collection customers ranked from those that need the most immediate collection attention to those who need lesser amounts of collection attention. The collection customer list may be obtained from an A/R database, collections database, or elsewhere.

In addition, the method 300 includes input of a list of collection agents and collection agent schedules from a database such as a human resources (H/R) database. (Step 506). This information will include, but is not necessarily limited to collection agent name, experience, daily, weekly or other working schedule, vacations, time off requests, special scheduling concerns and the like. Additionally, the method 300 requires input of lists of collection actions. (Step 508). A representative, but nonexclusive, list of collection actions includes telephone calls, personalized emails, automated emails, and other.

The above data can be applied to a worklist generation engine as described in detail with respect to method 400, FIG. 4. (Step 510). The output of the worklist generation engine is an individualized collection worklist for each collection agent. The worklist may be delivered, typically as an active graphical user interface on each collection agents computer desktop. The collection agent will then work through the collection actions detailed on his or her worklist. (Step 512).

As also described in detail with respect to method 400, the generation of a collection worklist is not a static process. Many entities with collection departments may have tens of thousands of collection customers and it is impossible for all of the collection agents to contact each collection customer daily or even weekly. Therefore, prioritization as described herein and contact deferral as described below may be incorporated into the system. Furthermore, the A/R (Accounts Receivables) status of any given collection customer changes as payment on open invoices is made, or other collection activities occur. Therefore, the collection worklist must be updated regularly, for example daily, weekly, or monthly, to remain current and useful for optimizing collection activities. Finally, the models used to prepare a collection worklist can be updated and optimized to enhance the likelihood that the collection worklist generation process most efficiently improves collection agent efficiency, productivity, and ultimately generates positive collection results.

Returning to FIG. 5, the method 500 includes the periodic or continuous monitoring of collection agent productivity metrics as subsequent iterations of collection worklists are distributed and executed by collection agents. Representative indicia of collection agent productivity include but are not limited to the number of collection customers contacted during the time interval, an amount collected during the time interval, an account receivable status of a collection customer, or feedback from one of the collection agents or a supervisor. (Step 514).

Machine learning algorithms may be trained and executed to identify trends in the individual or aggregated collection agent productivity metrics. (Step 516). Alternatively, or in addition, machine learning algorithms can be trained and executed to identify trends in the A/R status of various collection customers. In an embodiment where the machine learning algorithms focused on collection agent productivity, the machine learning algorithms may be executed to implement changes to the worklist generation engine (Step 518). This process is described in detail below with respect to method 400.

The foregoing processes may be repeated over selected time periods, for example daily, weekly, monthly, or the like. (Step 520). Thus, the machine learning module(s) are repetitively retrained and re-utilized to enhance effectiveness of the worklist generation engine to ensure that each generation of the collection worklist is (A) optimized to support efficient and highly productive collection agents who perform efficient and highly productive collection activities and (B) adapted to the most current collection agent scheduling concerns and/or the most current A/R status of the collection customers.

An alternative method 600 of FIG. 6 begins with the receipt into a computing system of a collections customer list. (Step 602). The collections customer list will include all, or a subset of the collections customers maintained by an entity within a collections department. Logical subsets of collection customers might be organized by region, industry, account size, subsidiary or other criteria. Typically, the collections customer list will be maintained in one or more databases utilized by financial management personnel. For example, it is common for a collections customer list to be maintained in accounts receivable ("AIR") database maintained as part of an entity's billing and collections or other financial management software suite.

The collections customer list may be input manually by a user. More typically, the collections customer list will be automatically generated from the appropriate database. Customer data related to A/R status is likely to be maintained in the same database or databases. Alternatively, customer data related to A/R status may be maintained in different databases or maintained by different software suites that the collections customer lists. Customer data related to A/R status may be downloaded, input by user, or otherwise made available to the systems described herein.

Representative examples of customer data related to A/R status includes but is not limited to total past due amount across all invoices, A/R aging categorized by time period, i.e. 30 days past due, 60 days past due, 90 days past due and the like, customer risk profile i.e. credit worthiness and history, past promise to pay violations, open receivables amount, disputed receivables amount, open promise to pay amount, past broken promise to pays, past due invoice count, disputes count, upcoming past due invoices/amounts, and other customer data related to A/R status. Some or all of this customer data may be input to the system for processing to generate a prioritized collections customer list. (Step 604). As described in detail with respect to method 200, FIG. 2 below, the collections customer list and customer data relating to A/R status are analyzed using a ranking engine. (Step 606). The ranking engine performs various automated, and/or user directed, processes as described in detail with respect to method 200. The output of the rankings engine is a collection impact score for each collection customer on the collection customer list. (Step 608).

The system may then generate a prioritized list of the collection customers ordered according to the calculated collection impact score for each customer. (Step 610). The system may use the prioritized list of collection customers to generate individual collection worklists for each collection agent, according to the steps of FIG. 3 or FIG. 4 (Step 612). The individual collection worklist may be delivered to each collection agent, after which collection activities are executed by the collection agents. (Step 614)

The generation of a collection impact score for each collection customer and the formulation of a prioritized list is not a static activity. Specifically, the disclosed systems and software are configured to monitor customer data from the various A/R databases or information sources described above to determine A/R status as it evolves over multiple time periods. (Step 616). The system and software embodiments described herein include machine learning modules having algorithms which may be trained to identify trends in the A/R status of one or more collection customers over time. (Step 618). As described in detail with respect to method 200, the data used to train the machine learning modules includes but is not necessarily limited to total past due amount across all invoices, A/R aging categorized by time period, i.e. 30 days past due, 60 days past due, 90 days past due and the like, customer risk profile i.e. credit worthiness and history, past promise to pay violations, open receivables amount, disputed receivables amount, open promise to pay amount, past broken promise to pays, past due invoice count, disputes count, upcoming past due invoices/amounts, and other customer data related to A/R status, and additional data derived from the raw A/R data noted above.

After initial training, the machine learning algorithm(s) can be used to identify trends in the A/R status of one or more collection customers. One goal is to identify positive trends in the A/R status across multiple customers, although negative trends can also be informative to subsequent processes. Specifically, the machine learning algorithm(s) can be used to directly implement changes to the data or processing steps utilized by the ranking engine to optimize the generation of subsequent prioritized collection customer lists. (Step 620). More detail concerning the optimization process is included in method 200. Furthermore, the machine learning algorithm(s) may output suggestions for a user to input to the ranking engine, or the machine learning algorithm(s) may directly control the ranking engine.

The foregoing processes may be repeated over selected time periods, for example daily, weekly, monthly, or the like. Thus, the machine learning module(s) are repetitively retrained and re-utilized to enhance effectiveness of the ranking engine had to ensure that each generation a prioritized list of collection customers is (A) optimized to support efficient collection activities and (B) adapted to the most current A/R status of the collection customers. (Step 622).

Exemplary System and Hardware Implementation

Figure 7:
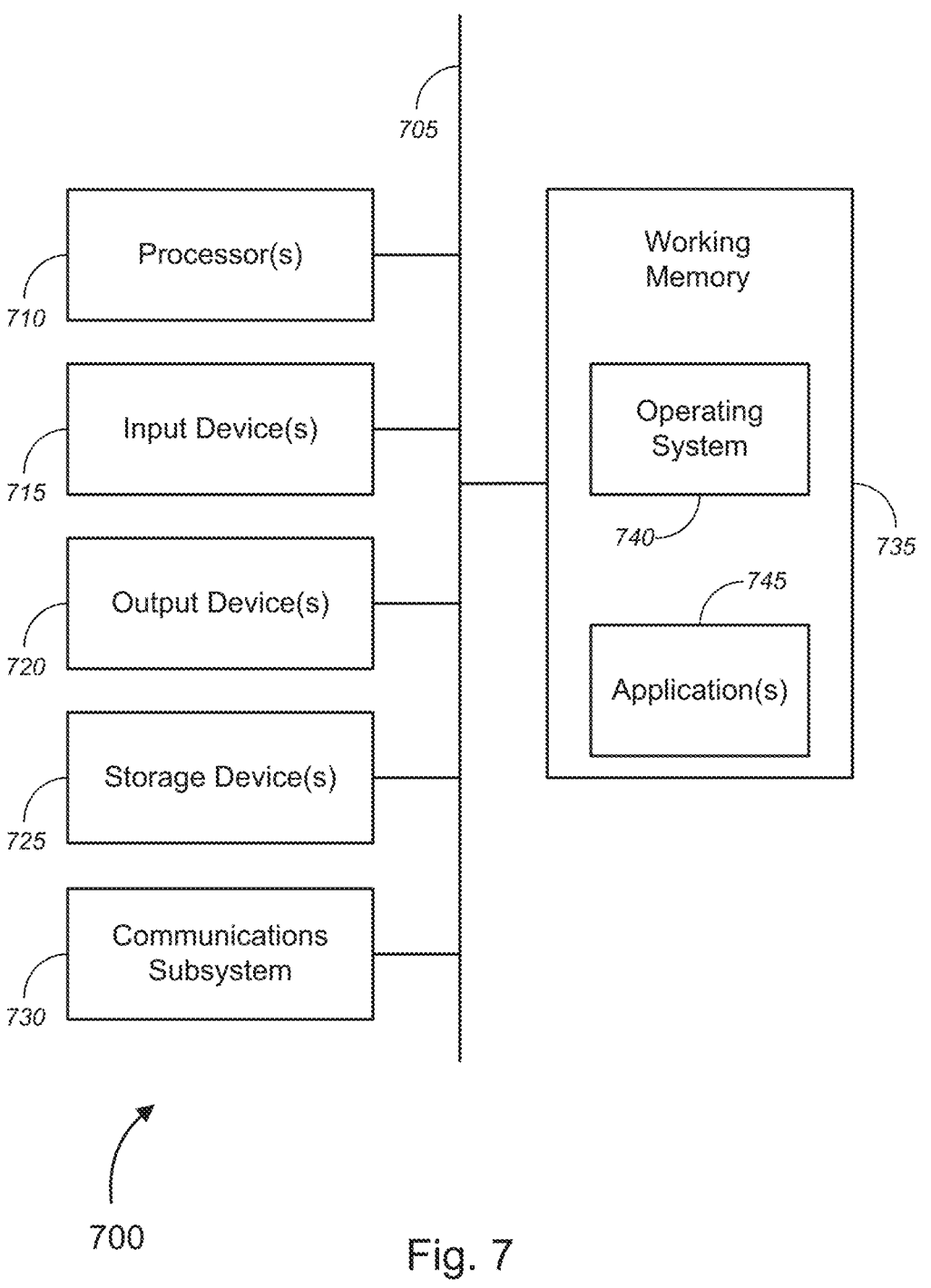
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 that can perform the methods provided by various other embodiments, as described herein, and/or can perform the functions of a computer or hardware system as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700 is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and/or the like); one or more input devices 715, which can include, without limitation, a mouse, a keyboard, and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods. The hardware aspects of a ranking engine 250, or worklist engine 450 may be implemented in the computer or hardware system 700

A set of instructions and/or code for implementing methods 100, 200, 300, 400, 500, or 600 might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments disclosed herein. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein including but not limited to methods 100, 200, 300, 400, 500, or 600.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire, and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
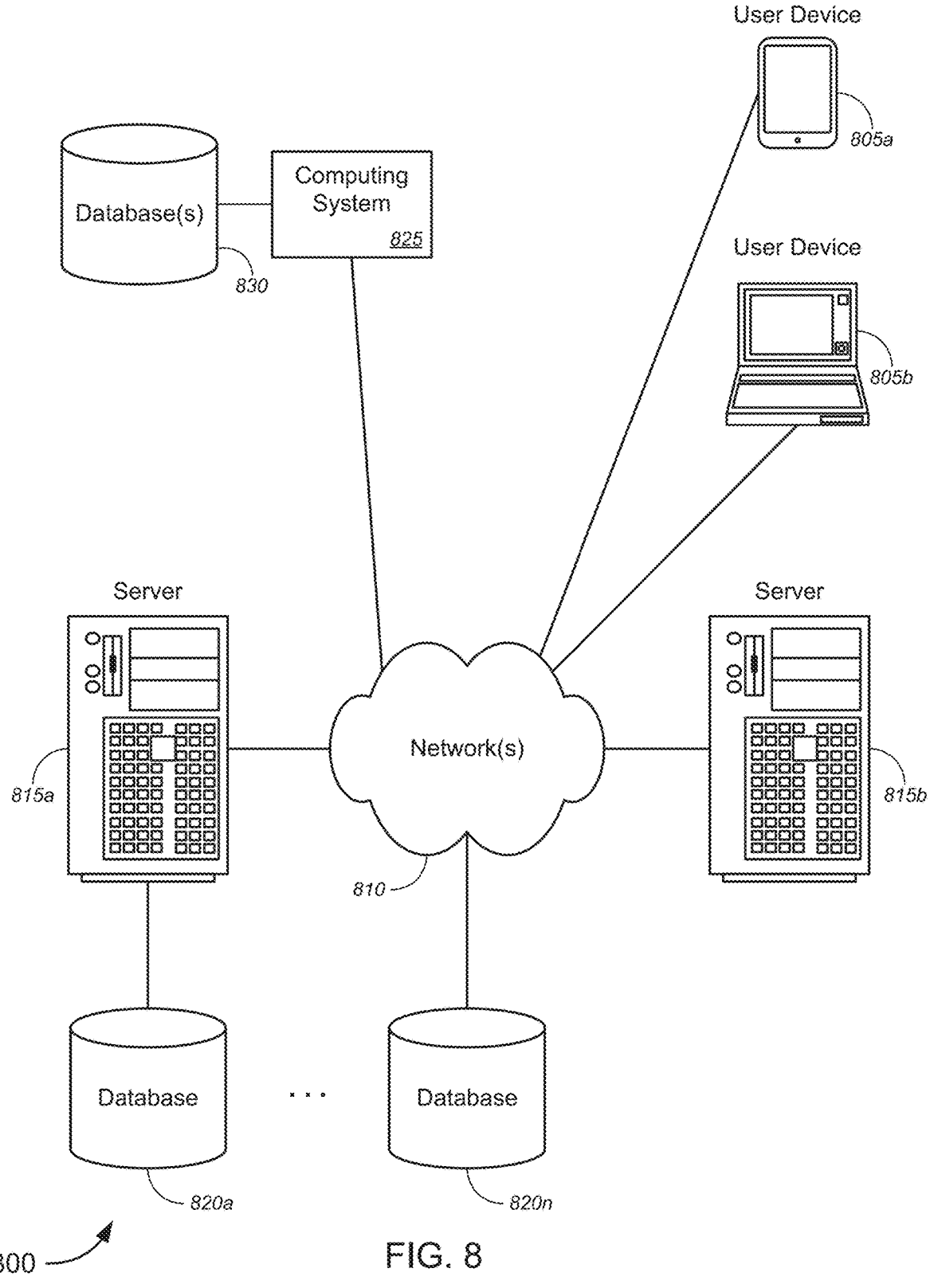
FIG. 8 is a block diagram illustrating a networked system of computers, computing systems, or system hardware architecture, which can be used in accordance with various embodiments.

As noted above, a set of embodiments comprises systems and methods for implementing collection customer ranking and visualization for accounts receivables and collections management processes and for implementing, generation, and visualization of individual collection worklists for collection agents. FIG. 8 illustrates a schematic diagram of a system 800 that can be used in accordance with various embodiments. The system 800 can include one or more user computers, user devices, or customer devices 805. A user computer, user device, or customer device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 805 can also have any of a variety of applications, including one or more applications configured to perform methods provided by various embodiments (as described above, for example), as well as one or more office applications, database client and/or server applications, and/or web browser applications. Alternatively, a user computer, user device, or customer device 805 can be any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user computers, user devices, or customer devices 805, any number of user computers, user devices, or customer devices can be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, TCP/IP, SNA™ IPX™ AppleTalk™, and the like. Merely by way of example, the network(s) 810 can each include a local area network ("LAN"), including, without limitation, a fiber network, an Ethernet network, a Token-Ring network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some the web server may be configured to serve web pages that can be operated within a web browser on one or more of the user computers 805 to perform methods as disclosed herein.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing wireless functionality, and, more particularly, to methods, systems, and apparatuses for implementing faceplate-based wireless device functionality and wireless extension functionality, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer

805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820a-820n (collectively, "databases 820"). The location of each of the databases 820 is discretionary: merely by way of example, a database 820a might reside on a storage medium local to (and/or resident in) a server 815a (and/or a user computer, user device, or customer device 805). Alternatively, a database 820n can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

According to some embodiments, system 800 might further comprise a computing system 825 and corresponding database(s) 830. In operation, the computing system 825 may be used to implement methods and systems for implementing collection customer ranking and visualization for accounts receivables and collections management processes and for implementing, generation, and visualization of individual collection worklists for collection agents described herein.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the disclosure is intended to cover all modifications and equivalents within the scope of the foregoing disclosure.

What is claimed is:

1. A computer-implemented method comprising:
generating, using a computing system, a series of collection worklist sets, wherein the generation of each collection worklist set in the series is separated from the generation of the preceding collection worklist set by a time interval, and wherein each collection worklist in a collection worklist set is generated for one of a plurality of collection agents, wherein the plurality of collection agents are one or more software modules executing the collection worklist set, and wherein the generation of the collection worklist set for one time interval comprises;
inputting a plurality of data inputs to the computing system by;
generating with a first machine learning algorithm using customer data a list of multiple collection customers ordered according to a prioritized need for collection activity by accessing with the computing system one or more databases comprising the customer data, by:
configuring, on the computing system, a ranking engine to calculate a collection impact score for each of the collection customers by applying a weighted model, wherein the collection impact score is calculated by:
calculating a plurality of derived ranking variables, including a Weighted Average Days Late (WADL) and a Weighted Clean Past Due (WCPD) from a plurality of direct ranking variables related to accounts receivable status of the collection customers;
applying a weighting to the plurality of direct ranking variables and the plurality of derived ranking variables using the weighted model to create a plurality of weighted direct ranking variables and a plurality of weighted derived ranking variables; and
inputting the plurality of weighted direct ranking variables and the plurality of weighted derived ranking variables to the raking engine to calculate the collection impact score for each of the collection customer; and
generating, using the configured ranking engine, a prioritized list of collection customers ordered based on the calculated collection impact score for each of the collection customer;
obtaining a list of the plurality of collection agents;
assigning a time available for each collection agent to perform collection actions within the time interval;
entering a list of the collection actions; and
associating a collection action duration with each of the collection actions;

generating with a second machine learning algorithm, the collection worklist set for one time interval by processing the plurality of data inputs with the computing system by;

calculating a collection action distribution, wherein the collection action distribution comprises a time allocation of the collection actions over a time interval;

calculating an initial cadence, based upon the time available for each collection agent to perform collection actions within the time interval, and based upon the collection action distribution;

creating an action assignment based upon the initial cadence by assigning one of the collection customers to each of the collection actions on the initial cadence, based at least in part upon the prioritized need for collection activity;

generating an individual collection worklist for each collection agent from the action assignment; and delivering the collection worklist for each collection agent to each collection agent;

monitoring, with the computing system, over multiple instances of the time interval, one or more collection agent productivity metrics by accessing one or more devices associated with the plurality of collection agents executing the collection worklist set;

training a third machine learning algorithm to identify a positive trend or a negative trend in the one or more collection agent productivity metrics, based upon analysis, by the computing system, of the one or more collection agent productivity metrics;

executing the third machine learning algorithm to autonomously identify a positive trend or a negative trend in the one or more collection agent productivity metrics, based upon analysis, by the computing system, of the one or more collection agent productivity metrics;

training the third machine learning algorithm to change at least one of the plurality of data inputs to the computing system based upon the positive trend or the negative trend in the plurality of collection agent productivity metrics identified by the third machine learning algorithm; and executing the third machine learning algorithm to autonomously change at least one of the plurality of data inputs to the computing system based upon the positive trend or the negative trend in the plurality of collection agent productivity metrics identified by the third machine learning algorithm;

wherein the third machine learning algorithm autonomously changes at least one of the plurality of data inputs to the computing system between generation of the series of collection worklist sets and generation of a next series of collection worklist sets;

wherein executing the third machine learning algorithm to autonomously change at least one of the plurality of data inputs to the computing system comprises changing the first machine learning algorithm used to generate the list of multiple collection customers or changing customer data input into the first machine learning algorithm and changing the second machine learning algorithm used to generate the collection worklist set or changing at least one of the plurality of data inputs to the second machine learning algorithm;

wherein the third machine learning algorithm autonomously modifies the ranking engine by changing one or more formulas used to calculate the plurality of derived ranking variables, the weighted model and a weighting factor applied by the weighted model, to calculate an updated collection impact score used for generation of an updated prioritized list for the next series of collection worklist sets; and executing, with the computing system, the next series of collection worklist sets based on one or more changes implemented by the third machine learning algorithm to the first machine learning algorithm or the second machine learning algorithm, wherein the next series of collection worklist sets are different from the worklist collection set.

2. The computer-implemented method of claim 1 further comprising:

training the third machine learning algorithm to change at least one of the collection action duration, or the collection activity distribution based upon the positive trend or the negative trend in the plurality of collection agent productivity metrics identified by the third machine learning algorithm; and executing the third machine learning algorithm to autonomously change at least one of the collection action duration, or the collection action distribution based upon the positive trend or the negative trend in the plurality of collection agent productivity metrics identified by the third machine learning algorithm.

3. The computer-implemented method of claim 1, further comprising:

calculating a secondary cadence from the initial cadence, wherein the secondary cadence covers multiple instances of the time interval;

creating the action assignment based upon the secondary cadence, and by assigning one of the collection customers to each of the collection actions on the secondary cadence, based at least in part upon the prioritized need for collection activity; and generating one or more individual collection worklists for each collection agent from the action assignment.

4. The computer-implemented method of claim 1 wherein the one or more collection agent productivity metrics comprises a number of collection customers contacted during the time interval, an amount collected during the time interval, an accounts receivable status of a collection customer, or feedback from one of the collection agents or a collection agent supervisor.

5. The computer-implemented method of claim 1, wherein the step of assigning a customer to each of the collection actions on the action assignment is additionally based upon a customer allocation strategy.

6. The computer-implemented method of claim 1, wherein the step of assigning a customer to each of the collection actions on the action assignment is additionally based upon a preferred customer contact method.

7. The computer-implemented method of claim 6, wherein the preferred customer contact method is selected from telephone calls, personalized emails and automated emails.

8. A non-transitory computer readable medium comprising computer executable instructions that, when executed by one or more processing units, cause the one or more processing units to:

generate a series of collection worklist sets, wherein the generation of each collection worklist set in the series is separated from the generation of the preceding collection worklist set by a time interval, wherein each collection worklist in a collection worklist set is generated for one of a plurality of collection agents, wherein the plurality of collection agents are one or more software modules executing the collection worklist set, and wherein the generation of the collection worklist set for one time interval comprises;

inputting a plurality of data inputs to the computing system by;

generating with a first machine learning algorithm using customer data a list of multiple collection customers ordered according to a prioritized need for collection activity by accessing one or more databases comprising the customer data, by:

configuring, on the computing system, a ranking engine to calculate a collection impact score for each of the collection customers by applying a weighted model, wherein the collection impact score is calculated by:

calculating a plurality of derived ranking variables, including a Weighted Average Days Late (WADL) and a Weighted Clean Past Due (WCPD) from a plurality of direct ranking variables related to accounts receivable status of the collection customers;

applying a weighting to the plurality of direct ranking variables and the plurality of derived ranking variables using the weighted model to create a plurality of weighted direct ranking variables and a plurality of weighted derived ranking variables;

inputting the plurality of weighted direct ranking variables and the plurality of weighted derived ranking variables to the raking engine to calculate the collection impact score for each of the collection customer; and generating, using the configured ranking engine, a prioritized list of collection customers ordered based on the calculated collection impact score for each of the collection customer;

obtaining a list of the plurality of collection agents;

assigning a time available for each collection agent to perform collection actions within the time interval;

entering a list of the collection actions; and associating a collection action duration with each of the collection actions;

generating with a second machine learning algorithm, the collection worklist set for one time interval by processing the plurality of data inputs with the computing system by;

calculating a collection action distribution, wherein the collection action distribution comprises a time allocation of the collection actions over a time interval;

calculating an initial cadence, based upon the time available for each collection agent to perform collection actions within the time interval, and based upon the collection action distribution;

calculating an action assignment based upon the initial cadence;

assigning one of the collection customers to each of the collection actions on the action assignment, based at least in part upon the prioritized need for collection activity;

generating an individual collection worklist for each collection agent from the action assignment; and delivering the collection worklist for each collection agent to each collection agent;

monitor over multiple instances of the time interval, one or more collection agent productivity metrics by accessing one or more devices associated with the plurality of collection agents executing the collection worklist set;

train a third machine learning algorithm to identify a positive trend or a negative trend in the one or more collection agent productivity metrics, based upon analysis, by the computing system, of the one or more collection agent productivity metrics;

execute the third machine learning algorithm to autonomously identify a positive trend or a negative trend in the one or more collection agent productivity metrics, based upon analysis, by the computing system, of the one or more collection agent productivity metrics;

train the third machine learning algorithm to change at least one of the plurality of data inputs to the computing system based upon the positive trend or the negative trend in the plurality of collection agent productivity metrics identified by the third machine learning algorithm; and execute the third machine learning algorithm to autonomously change at least one of the plurality of data inputs to the computing system based upon the positive trend or the negative trend in the plurality of collection agent productivity metrics identified by the third machine learning algorithm;

wherein the third machine learning algorithm autonomously changes at least one of the plurality of data inputs to the computing system between generation of the series of collection worklist sets and generation of a next series of collection worklist sets;

wherein executing the third machine learning algorithm to autonomously change at least one of the plurality of data inputs to the computing system comprises changing the first machine learning algorithm used to generate the list of multiple collection customers or changing customer data input into the first machine learning algorithm and changing the second machine learning algorithm used to generate the collection worklist set or changing at least one of the plurality of data inputs to the second machine learning algorithm;

wherein the third machine learning algorithm autonomously modifies the ranking engine by changing one or more formulas used to calculate the plurality of derived ranking variables, the weighted model and a weighting factor applied by the weighted model, to calculate an updated collection impact score used for generation of an updated prioritized list for the next series of collection worklist sets; and execute the next series of collection worklist sets based on one or more changes implemented by the third machine learning algorithm to the first machine learning algorithm or the second machine learning algorithm, wherein the next series of collection worklist sets are different from the worklist collection set.

9. The non-transitory computer readable medium of claim 8, wherein the instructions further comprise instructions to cause the one or more processing units to:

train the third machine learning algorithm to change at least one of the collection action duration, or the collection activity distribution based upon the positive trend or the negative trend in the plurality of collection agent productivity metrics identified by the third machine learning algorithm; and execute the third machine learning algorithm to autonomously change at least one of the collection action duration, or the collection action distribution based upon the positive trend or the negative trend in the plurality of collection agent productivity metrics identified by the third machine learning algorithm.

10. The non-transitory computer readable medium of claim 8, wherein the instructions further comprise instructions to cause the one or more processing units to:

calculate a secondary cadence from the initial cadence, wherein the secondary cadence covers multiple instances of the time interval;

calculate the action assignment based upon the secondary cadence;

assign one of the collection customers to each of the collection actions on the secondary action assignment, based at least in part upon the prioritized need for collection activity; and generate one or more individual collection worklists for each collection agent from the secondary action assignment.

11. The non-transitory computer readable medium of claim 8, wherein the instructions further comprise instructions to cause the one or more processing units to analyze one or more collection agent productivity metrics as the third machine learning algorithm is trained, said productivity metrics comprising a number of collection customers contacted during the time interval, an amount collected during the time interval, an account receivable status of a collection customer, or feedback from one of the collection agents or a collection agent supervisor.

12. The non-transitory computer readable medium of claim 8, wherein the instructions further comprise instructions to cause the one or more processing units to assign a customer to each of the collection actions on the action assignment based upon a customer allocation strategy.

13. The non-transitory computer readable medium of claim 8, wherein the instructions further comprise instructions to cause the one or more processing units to assign a customer to each of the collection actions on the action assignment based upon a preferred customer contact method.

14. The non-transitory computer readable medium of claim 13, wherein the instructions further comprise instructions to cause the one or more processing units to assign a customer to each of the collection actions on the action assignment based upon a preferred customer contact method, and wherein the preferred customer contact method is selected from telephone calls, personalized emails and automated emails.

15. A computer system comprising:

one or more processors;

a non-transitory memory communicatively coupled to the one or more processors and storing instructions executable by the one or more processors to cause the one or more processors to:

generate a series of collection worklist sets, wherein the generation of each collection worklist set in the series is separated from the generation of the preceding collection worklist set by a time interval, wherein each collection worklist in a collection worklist set is generated for one of a plurality of collection agents, wherein the plurality of collection agents are one or more software modules executing the collection worklist set, and wherein the generation of the collection worklist set for one time interval comprises;

inputting a plurality of data inputs to the computing system by;

generating with a first machine learning algorithm using customer data a list of multiple collection customers ordered according to a prioritized need for collection activity by accessing one or more databases comprising the customer data, by:

configuring, on the computing system, a ranking engine to calculate a collection impact score for each of the collection customers by applying a weighted model, wherein the collection impact score is calculated by:

calculating a plurality of derived ranking variables, including a Weighted Average Days Late (WADL) and a Weighted Clean Past Due (WCPD) from a plurality of direct ranking variables related to accounts receivable status of the collection customers;

applying a weighting to the plurality of direct ranking variables and the plurality of derived ranking variables using the weighted model to create a plurality of weighted direct ranking variables and a plurality of weighted derived ranking variables; and inputting the plurality of weighted direct ranking variables and the plurality of weighted derived ranking variables to the raking engine to calculate the collection impact score for each of the collection customer; and generating, using the configured ranking engine, a prioritized list of collection customers ordered based on the calculated collection impact score for each of the collection customer;

obtaining a list of the plurality of collection agents;

assigning a time available for each collection agent to perform collection actions within the time interval;

entering a list of the collection actions; and associating a collection action duration with each of the collection actions;

generating with a second machine learning algorithm, the collection worklist set for one time interval by processing the plurality of data inputs with the computing system by;

calculating a collection action distribution, wherein the collection action distribution comprises a time allocation of the collection actions over a time interval;

calculating an initial cadence, based upon the time available for each collection agent to perform collection actions within the time interval, and based upon the collection action distribution;

calculating an action assignment based upon the initial cadence;

assigning one of the collection customers to each of the collection actions on the action assignment, based at least in part upon the prioritized need for collection activity;

generating an individual collection worklist for each collection agent from the action assignment; and delivering the collection worklist for each collection agent to each collection agent;

monitor over multiple instances of the time interval, one or more collection agent productivity metrics by accessing one or more devices associated with the plurality of collection agents executing the collection worklist set;

train a third machine learning algorithm to identify a positive trend or a negative trend in the one or more collection agent productivity metrics, based upon analysis, by the computing system, of the one or more collection agent productivity metrics;

execute the third machine learning algorithm to autonomously identify a positive trend or a negative trend in the one or more collection agent productivity metrics, based upon analysis, by the computing system, of the one or more collection agent productivity metrics;

train the third machine learning algorithm to change at least one of the plurality of data inputs to the computing system based upon the positive trend or the negative trend in the plurality of collection agent productivity metrics identified by the third machine learning algorithm; and execute the third machine learning algorithm to autonomously change at least one of the plurality of data inputs to the computing system based upon the positive trend or the negative trend in the plurality of collection agent productivity metrics identified by the third machine learning algorithm;

wherein the third machine learning algorithm autonomously changes at least one of the plurality of data inputs to the computing system between generation of the series of collection worklist sets and generation of a next series of collection worklist sets;

wherein executing the third machine learning algorithm to autonomously change at least one of the plurality of data inputs to the computing system comprises changing the first machine learning algorithm used to generate the list of multiple collection customers or changing customer data input into the first machine learning algorithm and changing the second machine learning algorithm used to generate the collection worklist set or changing at least one of the plurality of data inputs to the second machine learning algorithm;

wherein the third machine learning algorithm autonomously modifies the ranking engine by changing one or more formulas used to calculate the plurality of derived ranking variables, the weighted model and a weighting factor applied by the weighted model, to calculate an updated collection impact score used for generation of an updated prioritized list for the next series of collection worklist sets; and execute the next series of collection worklist sets based on one or more changes implemented by the third machine learning algorithm to the first machine learning algorithm or the second machine learning algorithm, wherein the next series of collection worklist sets are different from the worklist collection set.

16. The computer system of claim 15, wherein the instructions further comprise instructions to:

train the third machine learning algorithm to change at least one of the collection action duration, or the collection activity distribution based upon the positive trend or the negative trend in the plurality of collection agent productivity metrics identified by the third machine learning algorithm; and execute the third machine learning algorithm to autonomously change at least one of the collection action duration, or the collection action distribution based upon the positive trend or the negative trend in the plurality of collection agent productivity metrics identified by the third machine learning algorithm.

17. The computer system of claim 15, wherein the instructions further comprise instructions to:

calculate a secondary cadence from the initial cadence, wherein the secondary cadence covers multiple instances of the time interval;

calculate the action assignment based upon the secondary cadence;

assign one of the collection customers to each of the collection actions on the secondary action assignment, based at least in part upon the prioritized need for collection activity; and generate one or more individual collection worklists for each collection agent from the secondary action assignment.

18. The computer system of claim 15, wherein the instructions further comprise instructions to cause the one or more processing units to analyze one or more collection agent productivity metrics as the third machine learning algorithm is trained, said productivity metrics comprising a number of collection customers contacted during the time interval, an amount collected during the time interval, an account receivable status of a collection customer, or feedback from one of the collection agents or a collection agent supervisor.

19. The computer system of claim 15, wherein the instructions further comprise instructions to cause the one or more processing units to assign a customer to each of the collection actions on the action assignment based upon a customer allocation strategy.

20. The computer system of claim 15, wherein the instructions further comprise instructions to cause the one or more processing units to assign a customer to each of the collection actions on the action assignment based upon a preferred customer contact method selected from telephone calls, personalized emails, and automated emails.

* * * * *